US012793307B2

(12) United States Patent
Su et al.

(10) Patent No.: US 12,793,307 B2
(45) Date of Patent: Nov. 10, 2026

(54) GENERATING IMAGE DATA OF A VIRTUAL OBJECT BASED ON A FUSED AUDIO FEATURE

(71) Applicant: Tencent Technology (Shenzhen) Company Limited, Shenzhen (CN)

(72) Inventors: Guinan Su, Shenzhen (CN); Gao Wu, Shenzhen (CN); Zhifeng Li, Shenzhen (CN); Wei Liu, Shenzhen (CN); Yushi Cui, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 12 days.

(21) Appl. No.: 18/649,772

(22) Filed: Apr. 29, 2024

(65) Prior Publication Data

US 2024/0282033 A1 Aug. 22, 2024

Related U.S. Application Data

(63) Continuation of application No. PCT/CN2023/119140, filed on Sep. 15, 2023.

(30) Foreign Application Priority Data

Sep. 16, 2022 (CN) ......................... 202211127727.7

(51) Int. Cl.
*G06T 13/20* (2011.01)
*G06T 13/40* (2011.01)
(Continued)

(52) U.S. Cl.
CPC ............ *G06T 13/205* (2013.01); *G06T 13/40* (2013.01); *G06V 40/16* (2022.01); (Continued)

(58) Field of Classification Search
None
See application file for complete search history.

(56) References Cited

U.S. PATENT DOCUMENTS

2005/0248346 A1* 11/2005 Sellers ............... G01R 33/3854 324/318
2006/0290699 A1* 12/2006 Dimtrva ............ H04N 21/4341 345/473
(Continued)

FOREIGN PATENT DOCUMENTS

CN 110459241 A 11/2019
CN 113299312 A 8/2021
(Continued)

OTHER PUBLICATIONS

Extended European Search Report and Search Opinion received for European Application No. 23861664.3, mailed on Feb. 3, 2025, 12 pages.
(Continued)

*Primary Examiner* — Joni Hsu
(74) *Attorney, Agent, or Firm* — ARENTFOX SCHIFF LLP

(57) ABSTRACT

A video generation method includes obtaining audio data and initial image data of a virtual object, extracting an audio feature from the audio data, and performing predictive encoding on the audio data to obtain an encoded feature representing vocal channel characteristics of the audio data. The method further includes fusing the audio feature and the encoded feature to obtain a fused audio feature, and generating updated image data of the virtual object according to the fused audio feature and the initial image data. The method further includes generating video data including the updated image data and the audio data.

20 Claims, 7 Drawing Sheets

(51) Int. Cl.

| | |
|---|---|
| ***G06V 40/16*** | (2022.01) |
| ***G10L 15/18*** | (2013.01) |
| ***G10L 25/24*** | (2013.01) |
| ***G10L 25/75*** | (2013.01) |

(52) U.S. Cl.
CPC .......... *G10L 15/1815* (2013.01); *G10L 25/24* (2013.01); *G10L 25/75* (2013.01)

(56) References Cited

U.S. PATENT DOCUMENTS

| | | | | |
|---|---|---|---|---|
| 2009/0287489 | A1* | 11/2009 | Savant | G10L 21/0364 704/E15.001 |
| 2014/0277640 | A1* | 9/2014 | Bilobrov | G10L 25/54 700/94 |
| 2017/0365264 | A1* | 12/2017 | Disch | G10L 19/13 |
| 2023/0215068 | A1* | 7/2023 | Sima | G10L 15/22 345/474 |
| 2024/0144568 | A1* | 5/2024 | Gururani | G06N 3/045 |

FOREIGN PATENT DOCUMENTS

| | | | |
|---|---|---|---|
| CN | 113313797 | A | 8/2021 |
| CN | 113901894 | A | 1/2022 |
| WO | 2021/073416 | A1 | 4/2021 |

OTHER PUBLICATIONS

Wen et al., "Photorealistic Audio-driven Video Portraits", IEEE Transactions on Visualization and Computer Graphics, IEEE, USA, vol. 26, No. 12, XP011819361, Sep. 17, 2020, pp. 3457-3466.

International Search Report and Written Opinion received for PCT Patent Application No. PCT/CN2023/119140, mailed on Nov. 15, 2023, 12 pages (5 pages of English Translation and 7 pages of Original Document).

Office Action received for Singaporean Patent Application No. 11202402913X, mailed on Sep. 19, 2026, 8 pages.

* cited by examiner

GENERATING IMAGE DATA OF A VIRTUAL OBJECT BASED ON A FUSED AUDIO FEATURE

RELATED APPLICATIONS

This application is a continuation of International Application No. PCT/CN2023/119140, filed on Sep. 15, 2023, which claims priority to Chinese Patent Application No. 202211127727.7, entitled "VIDEO GENERATION METHOD AND APPARATUS FOR VIRTUAL OBJECT, AND COMPUTER-READABLE STORAGE MEDIUM," filed on Sep. 16, 2022. The disclosures of the prior applications are hereby incorporated by reference in their entirety.

FIELD OF THE TECHNOLOGY

This disclosure relates to the field of Internet technologies, including a video generation technology.

BACKGROUND OF THE DISCLOSURE

In recent years, with the development of Internet technologies, virtual objects such as virtual humans have been increasingly used in content display scenarios such as advertising and live broadcasts. To improve the similarity between virtual objects and real humans, mouth closure of virtual objects is often controlled to simulate real human speech behavior.

Due to limitations of equipment, venue, time cost and other factors, for an advertising scene that requires mass production of virtual object mouth movements in a short time, a method of randomly controlling mouth closure of a virtual object is generally used to generate a video of a virtual object simulating speech in the advertising scene.

However, in the video of the virtual object generated by using the method of randomly controlling the mouth closure of the virtual object, the mouth shape of the virtual object does not match audio content, and accuracy of mouth shape generation of the virtual object is low, so that accuracy of video generation of the virtual object is poor, resulting in low efficiency in video generation of the virtual object.

SUMMARY

The aspects of this disclosure provide a video generation method and apparatus, and a computer-readable storage medium, which can improve accuracy of matching a target part status of a virtual object in video data with audio data, thereby improving accuracy of video generation based on the virtual object, and further improving efficiency of video generation for the virtual object.

In an aspect, a video generation method includes obtaining audio data and initial image data of a virtual object, extracting an audio feature from the audio data, and performing predictive encoding on the audio data to obtain an encoded feature representing vocal channel characteristics of the audio data. The method further includes fusing the audio feature and the encoded feature to obtain a fused audio feature, and generating updated image data of the virtual object according to the fused audio feature and the initial image data. The method further includes generating video data including the updated image data and the audio data.

In an aspect, a video generation apparatus includes processing circuitry configured to obtain audio data and initial image data of a virtual object, extract an audio feature from the audio data, and perform predictive encoding on the audio data to obtain an encoded feature representing vocal channel characteristics of the audio data. The processing circuitry is further configured to fuse the audio feature and the encoded feature to obtain a fused audio feature, and generate updated image data of the virtual object according to the fused audio feature and the initial image data. The processing circuitry is further configured to generate video data including the updated image data and the audio data.

In an aspect, a non-transitory computer-readable storage medium stores computer-readable instructions thereon, which, when executed by processing circuitry, cause the processing circuitry to perform a video generation method that includes obtaining audio data and initial image data of a virtual object, extracting an audio feature from the audio data, and performing predictive encoding on the audio data to obtain an encoded feature representing vocal channel characteristics of the audio data. The method further includes fusing the audio feature and the encoded feature to obtain a fused audio feature, and generating updated image data of the virtual object according to the fused audio feature and the initial image data. The method further includes generating video data including the updated image data and the audio data.

According to the aspects of this disclosure, the initial status data corresponding to the virtual object and the audio data are obtained. The initial status data is data of the initial appearance of the virtual object. To match the appearance data of the virtual object with the audio data, the updated status data can be obtained based on the initial status data, so that a target part change of the virtual object represented by the appearance data matches the audio data. Specifically, the audio feature can be extracted from the audio data, and the audio data can be encoded to obtain the encoded feature, so that the audio feature and the encoded feature can be fused to obtain the fused audio feature of the virtual object. Because the fused audio feature is obtained through fusion based on two different features (that is, the audio feature and the encoded feature), the audio feature and the encoded feature can reflect features of the audio data from different dimensions, so that the fused audio feature can more comprehensively and accurately characterize the features of the audio data. Based on such a fused audio feature and initial status data, the status of the target part can be obtained more accurately based on the updated status data obtained after the audio data changes, thereby generating, based on the updated status data and the audio data, video data in which the target part status and the audio data match. In this way, the audio feature and the encoded feature are extracted from the audio data, and the audio feature and the encoded feature are fused to obtain the fused audio feature, thereby generating the updated status data characterizing a status change of the target part according to the fused audio feature and the initial status data, and further generating, based on the updated status data and the audio data, video data in which the target part status and the audio data match. This improves the accuracy of matching the target part and the audio data in the video data, and improves the accuracy of video generation for the virtual object, and further improves the efficiency of video generation for the virtual object.

BRIEF DESCRIPTION OF THE DRAWINGS

To describe the technical solutions in the aspects of this disclosure more clearly, the following briefly describes the accompanying drawings describing the aspects. The accompanying drawings in the following description show merely some aspects of this disclosure, and a person skilled in the art may still derive other drawings from these accompanying drawings.

DETAILED DESCRIPTION

The technical solutions in the aspects of this disclosure are clearly and completely described below with reference to the accompanying drawings in the aspects of this disclosure. Apparently, the described aspects are merely some rather than all of the aspects of this disclosure. All other aspects obtained by a person skilled in the art based on the aspects of this disclosure shall fall within the protection scope of this disclosure.

The aspects of this disclosure provide a video generation method and apparatus, and a computer-readable storage medium. The video generation apparatus may be integrated in a computer device, and the computer device may be a server, a terminal, or another device.

The server may be an independent physical server, or may be a server cluster or a distributed system formed by a plurality of physical servers, or may be a cloud server that provides a basic cloud computing service such as a cloud service, a cloud database, cloud computing, a cloud function, cloud storage, a network service, cloud communication, a middleware service, a domain name service, a security service, a content delivery network (CDN), big data, and an artificial intelligence platform. The terminal may include but is not limited to a mobile phone, a computer, an intelligent voice interaction device, a smart home appliance, an in-vehicle terminal, an aircraft, and the like. The terminal and the server may be directly or indirectly connected in a wired or wireless communication manner. This is not limited in this disclosure.

Figure 1:
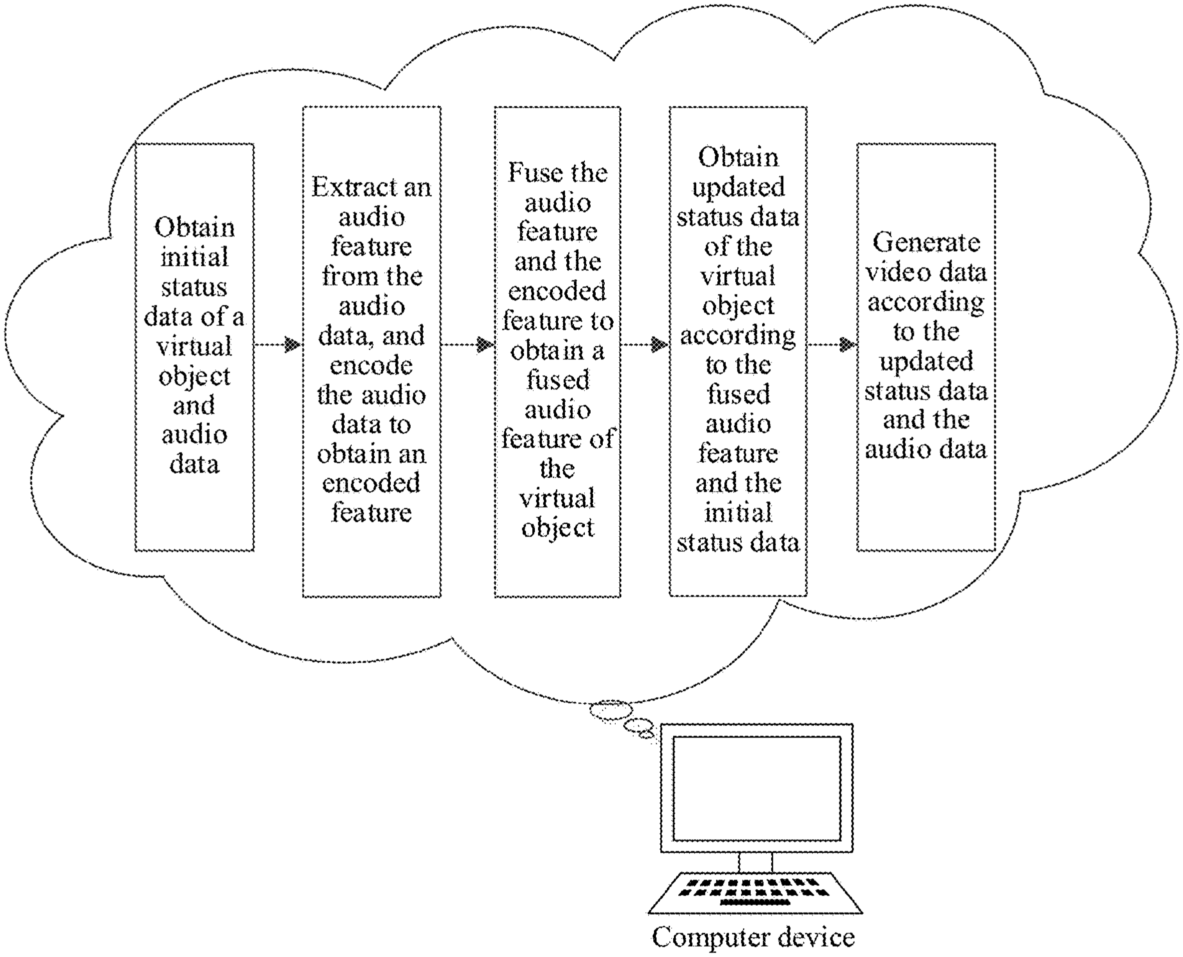
FIG. 1 is a schematic diagram of an implementation scenario of a video generation method according to an aspect of this disclosure.

Refer to FIG. 1. An example is used in which the video generation apparatus is integrated in a computer device. FIG. 1 is a schematic diagram of an implementation scenario of a video generation method according to an aspect of this disclosure. The computer device may be a server or a terminal. The computer device can obtain initial status data corresponding to a virtual object and audio data; extract an audio feature from the audio data, and encode the audio data to obtain an encoded feature; fuse the audio feature and the encoded feature to obtain a fused audio feature of the virtual object; obtain updated status data of the virtual object according to the fused audio feature and the initial status data; and generate video data according to the updated status data and the audio data. The status of the target part in the video data matches the audio data.

The aspects of the present disclosure may be applied to various scenarios, including but not limited to a cloud technology, artificial intelligence, smart transportation, assisted driving, and the like. The schematic diagram of the implementation environment scenario of the video generation method shown in FIG. 1 is only an example. The implementation environment scenario of the video generation method described in the aspects of this disclosure is intended to describe the technical solutions in aspects of this disclosure more clearly, and does not constitute any limitation on the technical solutions provided in aspects of this disclosure. A person of ordinary skill may learn that, with evolution of video generation and appearance of a new service scenario, the technical solutions provided in this disclosure also apply to a similar technical problem.

The solutions provided in the aspects of this disclosure involve technologies such as machine learning of artificial intelligence, and are specifically described by using the following aspects. A description order of the following aspects is not construed as a limitation on a preferred order of the aspects.

In this aspect, a description is made from the perspective of a video generation apparatus. The video generation apparatus may be integrated in a computer device, and the computer device may be a server. This is not limited in this disclosure.

Figure 2:
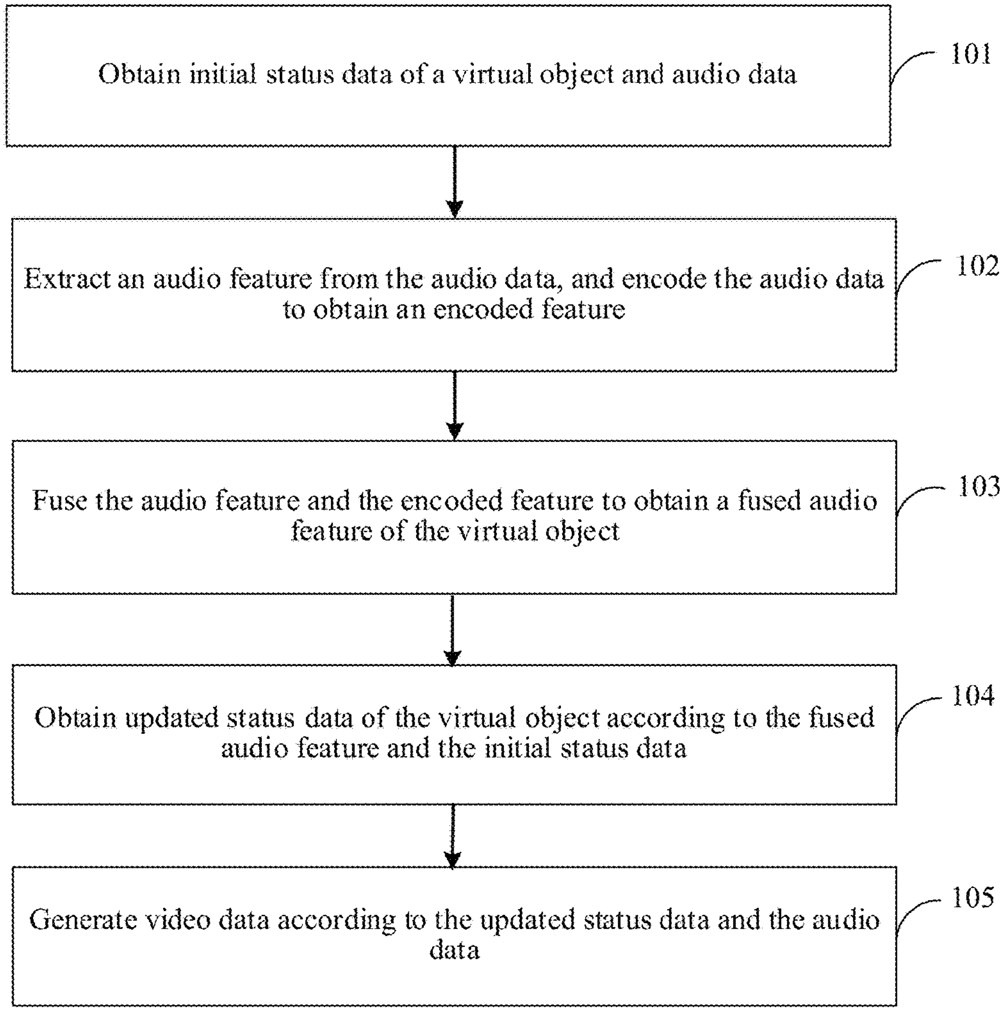
FIG. 2 is a schematic flowchart of a video generation method according to an aspect of this disclosure.

FIG. 2 is a schematic flowchart of a video generation method according to an aspect of this disclosure. The video generation method includes:

In step 101, initial status data of a virtual object and audio data are obtained. For example, audio data and initial image data of a virtual object are obtained.

The virtual object may be an object simulated in a virtual scene by using a digital technology. The virtual object may be an object constructed using a two-dimensional (2D) or three-dimensional (3D) model. For example, the virtual object may be a virtual human, a virtual animal, and another virtual image, in which a virtual human may be referred to as a digital person, which refers to a virtual image similar to a real human being simulated by a computer. The initial status data may be data of an initial status of the virtual object. In this aspect of this disclosure, "initial" is relative to subsequent updated status data, and is a relative rather than an absolute concept.

When the virtual object is an object constructed from a 3D model, the initial status data may be initial status three-dimensional data. In a possible implementation, the status may refer to the appearance. Therefore, the initial status data may be initial appearance data, and correspondingly, the updated status data may be updated appearance data. The appearance data may indicate the appearance of the virtual object, for example, may be a target area of the virtual object, such as a face area. Further, for example, the data may be a status of a target part in the target area, such as a mouth or eyes. This aspect of this disclosure is mainly described by using an example in which the target area is the face area. In this case, the initial status data may be initial facial data. The status herein may be static or action, such as opening, closing, laughing, crying, opening eyes, and closing eyes. In a possible implementation, the initial status data may be facial data of the virtual object in a static state. The static state may refer to a status when the virtual object does not perform actions and does not generate emotions. For example, the data may be facial data of the virtual object when not talking, eating, and laughing. The audio data may be data including an audio signal, which can cause a status of the target part of the initial face to change. The audio data may be, for example, a piece of advertisement audio or a piece of spoken word audio.

Figure 3A:
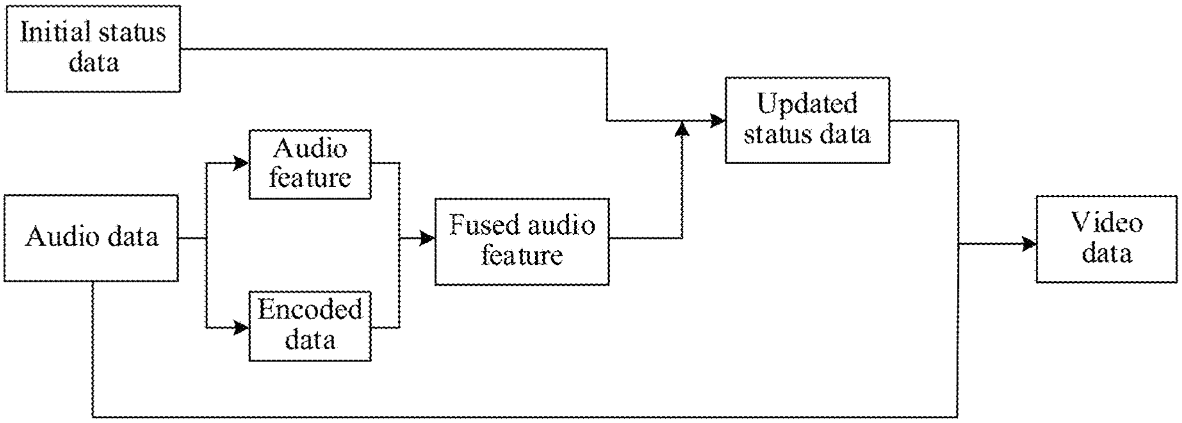
FIG. 3*a* is a schematic flowchart of another video generation method according to an aspect of this disclosure.

Refer to FIG. 3*a*, in this aspect of this disclosure, the initial status data and the audio data are obtained, feature extraction is performed on the audio data to obtain the audio feature, and the audio data is encoded to obtain the encoded feature. Feature fusion is performed on the audio feature and the encoded feature to obtain the fused audio feature. According to the fused audio feature and initial status data, the updated status data is obtained. Based on the updated status data and the audio data, rendering is performed to obtain the final video data.

Figure 3B:
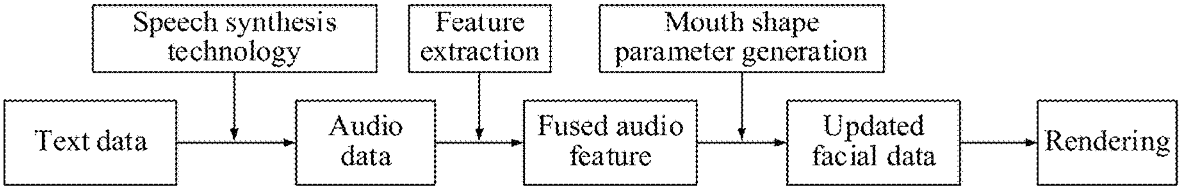
FIG. 3*b* is a specific schematic flowchart of a video generation method according to an aspect of this disclosure.

In this aspect of this disclosure, there may be many manners of obtaining the audio data. One manner is to directly obtain or acquire the audio data. Another manner is to obtain text data first and then obtain the audio data according to the text data, where the text data may be data in the form of text, for example, may be text data such as advertising copy or news copy. There are many manners of obtaining the audio data according to the text data. For example, FIG. 3*b* is a specific schematic flowchart of a video generation method according to an aspect of this disclosure. A semantic synthesis technology (Text To Speech, TTS for short) may be used to convert text data into audio data. For example, a Tacotron (an end-to-end TTS model for synthesizing audio from text) may be used, to perform subsequent steps on the audio data, such as performing feature extraction on the audio data to obtain the fused audio feature. The process of obtaining the fused audio feature based on the audio data may be seen in FIG. 3*a*, that is, the audio data is encoded to obtain the encoded feature, and feature fusion is performed on the audio feature and the encoded feature to obtain the fused audio feature. Details are not described again in FIG. 3*b*. When the initial status data is initial facial data and the target part is the mouth, the status of the mouth may be characterized by a mouth shape parameter. Therefore, to match the status of the mouth with the audio data, the mouth shape parameter can be generated according to the fused audio feature, and then updated facial data is obtained based on the mouth shape parameter. Rendering is performed based on the updated facial data and the audio data to obtain the final video data.

In step 102, an audio feature is extracted from the audio data, and the audio data is encoded to obtain an encoded feature. For example, an audio feature is extracted from the audio data, and predictive encoding is performed on the audio data to obtain an encoded feature representing vocal channel characteristics of the audio data.

To comprehensively and accurately reflect the features of the audio data from the perspective of human hearing of the audio data and from the perspective of vocal channel characteristics of the virtual object, in this aspect of this disclosure, the audio feature can be extracted from the audio data, and the audio data is encoded to obtain the encoded feature.

The audio feature may be a feature that reflects the characteristics of the audio data from the perspective of human hearing. Human cars have different auditory sensitivities to sound waves of different frequencies. In this aspect of this disclosure, a frequency that can better simulate auditory perception of the human car may be referred to as a target frequency. The manner of extracting the audio feature from the audio data may be to convert the audio data to a target frequency, and then perform cepstrum analysis to obtain the audio feature, where the audio feature may be referred to as a frequency feature. In a possible implementation, the target frequency may be a nonlinear frequency determined based on a sensory judgment of the human car on an equidistant pitch change, for example, may be a Mel frequency. Relative to a Hertz Frequency, the Mel frequency can represent sensitivity of the average human car to frequency. The audio feature may be information that characterizes the audio data at the target frequency, and can be used to deduce acoustic features of the audio data at the target frequency based on research results of a human auditory system. For example, the feature may include a spectral feature, an amplitude, intensity, a pitch, timbre, loudness, tone, and the like.

The pitch is related to a frequency of vocal cord vibration. The higher the frequency, the higher the pitch. The pitch is greatly affected by age and gender. In the normal population, young children and females have higher pitches, while adult males have lower pitches. A fundamental frequency is generally used to reflect the pitch. The fundamental frequency is a number of times the vocal cords vibrate in one second when the vocal cords vibrate periodically, that is, the frequency of vocal cord vibration. The unit is Hertz (Hz). Generally, a fundamental frequency of normal children is around 340 H, a fundamental frequency of normal women is around 250 Hz, and a fundamental frequency of adult men is around 130 Hz. Another parameter that reflects the pitch is a standard deviation of the fundamental frequency, which is a measured value of a fundamental frequency deviation. The unit is also Hz, and a normal value is less than 3 Hz.

The timbre may refer to characteristics of the sound, or the essence of speech, also referred to as tone quality. Different timbres are formed due to different forms of sound wave vibration, which is the basic feature that distinguishes one sound from other sounds. There are three main conditions that cause different timbres: ① different pronunciation bodies; ② different pronunciation methods; and ③ different resonator shapes during pronunciation.

The intensity refers to the strength of the sound, which mainly depends on the amplitude of the sounding body (where the amplitude refers to a maximum displacement distance of the sounding body when vibrating, that is, the amplitude of vibration of the sounding body). The amplitude is proportional to the intensity. If the amplitude is large, the sound is strong; and if the amplitude is small, the sound is weak. The unit of the intensity may be decibel (db). Normally, 0 dB is sound that just can be heard; 15 dB feels quiet; 30 dB equals the volume of a whisper; 40 dB is hum of a refrigerator; 60 dB is sound of normal conversation; 70 dB is equivalent to walking in a downtown area; 85 dB is like on a road with cars passing by; 95 dB is sound of a motorcycle started; 100 dB is sound of a decoration electric drill, and so on.

The tone may refer to ups and downs (tonality, or referred to as pitch) and frustration (final or obliterated sounds) of a syllable during pronunciation. The tone is a suprasegmental component attached to a syllable. There may be four tones in the Chinese language: flat tone, rising tone, rising and falling tone, and falling tone.

In a possible implementation, the target frequency may be a Mel frequency, and an acoustic feature at the target frequency may be a Mel-frequency cepstral coefficient (MFCC) feature. In this case, the audio feature is an MFCC feature.

Obtaining the encoded feature based on encoding may be to simulate the principle of human vocalization and obtain the encoded feature by analyzing a cascade model of short tubes in the vocal tract. In a possible implementation, the encoding may be predictive encoding. Predictive encoding is mainly to sample the audio data to obtain a series of numbers, and then use a combination relationship between these numbers to predict a next sample value. Therefore, the function of feature extraction can be provided through predictive encoding, which converts the audio data into a feature vector that can be recognized by a computer device, that is, a predictive encoded feature. The predictive encoded feature may be a feature that characterizes the characteristics of audio data from the perspective of vocal channel characteristics. Specifically, the feature can characterize a combination relationship between audio frames in the audio data. That is, for an audio frame in the audio data, historical audio frames (i.e., previous audio frames) of the audio frame may be combined to fit the audio frame. The historical audio frames of this audio frame are all or some of audio frames that precede this audio frame in the audio data.

In a possible implementation, the predictive encoding may be linear predictive coding, and the predictive encoded feature at this time may be a linear predictive encoded feature (a linear feature). Therefore, when the foregoing audio feature is an MFCC feature, the characteristics of the audio data can be considered based on the MFCC feature from two aspects: linear feature and nonlinear feature (that is, the MFCC feature).

The main idea of Linear predictive coding (LPC) is to sample the audio data to obtain a series of numbers, and then use a linear relationship between these numbers to predict a next sample value. Therefore, the function of feature extraction can be provided through linear predictive encoding, which converts the audio data into a feature vector that can be recognized by a computer device, that is, a linear predictive encoded feature. The linear predictive encoded feature may be a feature obtained by performing linear predictive coding on the audio data. The linear predictive encoded feature may characterize a linear combination relationship between audio frames in the audio data and is a linear feature. Normally, the audio data may include a plurality of audio frames. For other audio frames except the first audio frame, each audio frame in the other audio frames may have a corresponding historical audio frame, and all or some of the audio frames preceding the audio frame may be used as the historical audio frames of the audio frame. In this aspect of this disclosure, for an audio frame, historical audio frames of the audio frame may be obtained, and the historical audio frames of the audio frame may be linearly combined, to fit the audio frame by using a linear combination relationship between the historical audio frames, thereby obtaining the linear combination relationship between the audio frame and the historical audio frames.

In a possible implementation, there may be many manners of extracting the audio feature from the audio data. For example, the audio data may be converted from the current frequency to a target frequency. A target spectrum corresponding to the audio data is obtained based on the audio data at the target frequency. Cepstrum analysis is performed on the audio data at the target frequency according to the target spectrum, to obtain the audio feature corresponding to the audio data.

The current frequency may be a frequency of an audio signal in the current audio data, for example, may be a Hertz (Hz) frequency. The target frequency may be a Mel frequency, and the target spectrum may be a parameter that is extracted from the audio data according to the target frequency and that characterizes a change of the audio signal of the audio data. For example, when the target frequency may be a Mel frequency, the target spectrum may be a Mel spectrum of the audio data.

Cepstrum (cepstrum) may refer to inverse Fourier transform of the Fourier transform spectrum of the audio data after a logarithmic operation. Cepstrum analysis means first performing the logarithmic operation on the Fourier transform spectrum of the audio data, and then perform inverse Fourier transform on a result of the logarithmic operation.

There are many manners of converting the audio data from the current frequency to the target frequency, and determining the target spectrum corresponding to the audio data based on the audio data at the target frequency. For example, framing processing may be performed on the audio data to obtain a plurality of audio frames. For each audio frame in the plurality of audio frames, windowing processing is performed on the audio frame, and frequency domain conversion processing is performed on the windowed audio frame to obtain spectrum information of the audio frame. Target frequency filtering is performed on the spectrum information to obtain the target spectrum corresponding to the audio data.

The audio frame may be an audio data frame obtained by dividing the audio data, and the spectrum information may be information characterizing the signal distribution of the audio data in the frequency domain.

There are many manners of performing framing processing on the audio data. For example, the audio data may be pre-emphasized to enhance the high-frequency part to flatten the spectrum of the audio signal. Meanwhile, effects caused by vocal cords and lips in the audio data may be eliminated, and the high-frequency part of the speech signal that is suppressed by the articulation system can be compensated, so that framing processing can be performed on the pre-emphasized audio data to divide the audio data into a plurality of audio frames to facilitate analysis of the audio data.

After framing processing is performed on the audio data, because a length of the signal processed by the computer device is limited, to better perform subsequent steps on the audio frame, windowing processing may be performed on the audio frame, so that the audio frame can be truncated into small chunks (that is, windows) for processing. In a signal processing technology, windowing processing is a basic technology that may be used to improve signal quality and performance. Windowing processing can also be referred to as window function processing. A window function is used to divide a signal into small blocks of equal width. Such small blocks are referred to as windows, and each window has a window function. The purpose of windowing processing is to determine a suitable window function so that the size of the window may be changed reasonably to meet the requirements of signal processing. In this way, the signal transmission efficiency can be effectively improved, the noise can be reduced, and the signal quality can be improved.

The process of performing windowing processing on the audio frame is mainly divided into several steps: the first step is to divide the audio frame into several small blocks, that is, windows; the second step is to set an appropriate window function for each window; the third step is to perform windowing processing on the audio frame according to the specified window function; and the last step is to recombine the processed audio frames into the initial audio frame. There may be many manners of performing windowing processing on the audio frame. For example, a window function may be used to perform windowing processing on the audio frame. For example, a Hamming window may be used to perform windowing processing on the audio frame.

After windowing processing is performed on the audio frame, frequency domain conversion processing may be performed on the windowed audio frame. Frequency domain conversion processing is used to convert time domain signals into frequency domain signals. In this aspect of this disclosure, frequency domain conversion processing mainly refers to converting signals in time domain of the windowed audio frame into energy distribution in frequency domain. There are many manners of performing frequency domain conversion on the windowed audio frame. For example, Fourier transform methods such as Fast Fourier Transform (FFT) may be used to convert the signal of the windowed audio frame in time domain into the energy distribution in frequency domain, thereby obtaining the spectrum information corresponding to each audio frame.

After frequency domain conversion processing is performed on the windowed audio frame, target frequency filtering may be performed on the spectrum information. Filtering processing may refer to filtering out redundant information in the spectrum information. There may be many manners of performing target frequency filtering on the spectrum information. For example, a filter bank corresponding to the target frequency may be used to perform target frequency filtering on the spectrum information of the audio frame, to remove the redundant information in the spectrum information and obtain the target spectrum corresponding to the audio data. The filter bank may be a plurality of filter banks based on dividing the spectrum of the target frequency according to the sensitivity of the human ear, and for example, may be a Mel filter bank.

Figure 3C:
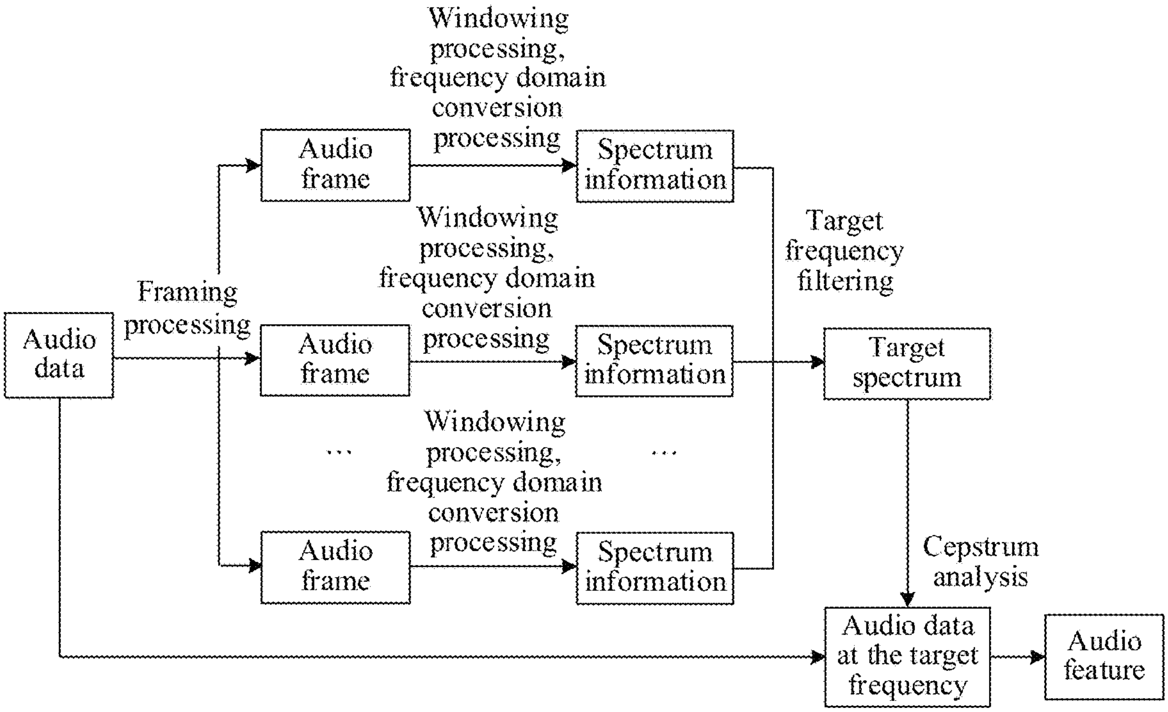
FIG. 3*c* is a schematic flowchart of extracting an audio feature from audio data according to an aspect of this disclosure.

Based on the description above, for the schematic flowchart of extracting the audio feature from the audio data, refer to FIG. 3*c*. Framing processing is performed on the audio data to obtain a plurality of audio frames. For each audio frame in the plurality of audio frames, windowing processing is performed on the audio frame, and frequency domain conversion processing is performed on the windowed audio frame to obtain spectrum information of the audio frame. Target frequency filtering is performed on the spectrum information to obtain the target spectrum corresponding to the audio data. Cepstrum analysis is performed on the audio data at the target frequency according to the target spectrum to obtain the audio feature corresponding to the audio data.

After the audio data is converted from the current frequency to a target frequency, and the target spectrum corresponding to the audio data is determined based on the audio data at the target frequency, cepstrum analysis may be performed on the audio data at the target frequency according to the target spectrum. There are many manners of performing cepstrum analysis on the audio data at the target frequency according to the target spectrum. For example, nonlinear conversion may be performed on the target spectrum to obtain a nonlinear conversion result, and low-frequency information extraction may be performed on the nonlinear conversion result to obtain low-frequency information of the audio data, and extract the audio feature corresponding to the audio data from the low-frequency information.

The nonlinear conversion result may be a result obtained by performing nonlinear conversion on the target spectrum. The low-frequency information may be information obtained by concentrating the energy of the audio data in low frequencies. The low-frequency information may be a target frequency cepstral coefficient, and the target frequency cepstral coefficient may be a coefficient that constitutes the target frequency cepstrum, for example, may be a Mel frequency cepstral coefficient. In a possible implementation, the frequency may be defined by a frequency range. Generally, a frequency below 50 Hz may be referred to as an extremely low frequency band, a frequency between 50 Hz and 200 Hz may be referred to as a low frequency band, a frequency between 200 Hz and 6000 Hz may be referred to as an intermediate frequency band, and a frequency between 6000 Hz and 20000 Hz may be referred to as a high frequency band. The information obtained by concentrating the energy of the audio data in a low-frequency band may be referred to as low-frequency information.

There are many manners of performing nonlinear conversion on the target spectrum. For example, the target spectrum may be subjected to a logarithmic operation to obtain the nonlinear conversion result. Because perception of the human ear for sound is not linear, converting the target spectrum to a nonlinear relationship such as the logarithmic operation can better achieve the description of the audio signal of the audio data.

The target spectrum may be expressed as:

$$X[k]=H[k]E[k].$$

X[k] can represent the target spectrum, H[k] can represent the envelope, and E[k] can represent details of the target spectrum.

When only the amplitude is considered, the target spectrum may be expressed as:

$$|X[k]|=|H[k]||E[k]|.$$

The logarithm of both sides is taken, that is, a logarithmic operation is performed on the target spectrum:

$$\log||X[k]||=\log||H[k]||+\log||E[k]||.$$

After nonlinear conversion is performed on the target spectrum, low-frequency information extraction may be performed on the nonlinear conversion result. There are many manners of performing low-frequency information extraction on the nonlinear conversion result. For example, discrete cosine transform (DCT), discrete Fourier transform (DFT) and other transformation methods may be used to perform low-frequency information extraction on the nonlinear conversion result, to concentrate the energy corresponding to the audio data into the low-frequency part.

After low-frequency information extraction is performed on the nonlinear conversion result, the audio feature corresponding to the audio data may be extracted from the low-frequency information. There are many manners of extracting the audio feature corresponding to the audio data from the low-frequency information. For example, some coefficients may be selected from the low-frequency information as the audio feature. For example, assuming that the target frequency is a Mel frequency, the second coefficient to the thirteenth coefficient may be used as Mel frequency cepstral coefficients in the low-frequency information obtained after discrete cosine transform, so that the Mel frequency cepstral coefficient corresponding to each audio frame may be used as the feature information corresponding to the audio frame. According to the feature information of each audio frame, the audio feature corresponding to the audio data can be obtained. In a possible implementation, because the audio signal is continuous in time domain, the feature information of the audio frame extracted through framing only reflects characteristics of the audio of this frame. To make the feature better reflect the time domain continuity, the feature information corresponding to the audio frame corresponding to the audio data can be added to the feature dimension by the dimension of the preceding and following frame information, thereby obtaining the audio feature corresponding to the audio data.

There may be many manners of encoding the audio data, and in a possible implementation, the encoding may be linear encoding. In this case, the manner of encoding the audio data to obtain the encoded feature may be: constructing, for each audio frame included in the audio data according to the audio frame and a historical audio frame corresponding to the audio frame in the audio data, a linear combination relationship between the audio frame and the historical audio frame; and determining the encoded feature corresponding to the audio data based on the linear combination relationship. In this case, the encoded feature may be a linear predictive encoded feature.

The audio frame may be an audio data frame obtained by performing framing processing on the audio data. The historical audio frame may be an audio frame before the current audio frame in a time sequence corresponding to the audio data. For example, it is assumed that the audio data is (Y1, Y2, Y3, Y4), where Y1, Y2, Y3, and Y4 are audio frames in the audio data arranged in chronological order. For the audio frame Y2, Y1 may be a historical audio frame of Y2. For the audio frame Y3, Y1 and Y2 may be historical audio frames of Y3. The linear combination relationship may be a relationship in the form of a linear combination between the audio frame and the corresponding historical audio frame.

The linear predictive encoded feature may be an LPC feature. Because a voice sample may be approximated by a linear combination of several past voice samples. By making a sample obtained through linear prediction approximate an actual voice sample, a unique set of prediction coefficients can be obtained. The prediction coefficients herein are weighting coefficients used in the linear combination, that is, the linear predictive encoded features.

There may be many manners of constructing the linear combination relationship between the audio frame and the historical audio frame according to the audio frame and the historical audio frame corresponding to the audio frame in the audio data. For example, assuming that the audio data is (Y1, Y2, Y3, Y4), for the audio frame Y3, a linear combination relationship between the audio frame and the historical audio frame may be constructed as $Y3=a1*Y1+a2*Y2$, where a1 and a2 may be weighting coefficients in the linear combination.

After the linear combination relationship between the audio frame and the historical audio frame is constructed according to the audio frame of the audio data and the historical audio frame corresponding to the audio frame in the audio data, the encoded feature corresponding to the audio data can be determined based on the linear combination relationship. There may be many manners of determining the encoded feature corresponding to the audio data based on the linear combination relationship. For example, the linear combination relationship may be converged to minimize an error between a predicted audio signal and an initial audio signal, so that a weighting coefficient can be solved, and the encoded feature corresponding to the audio data can be obtained according to the weighting coefficient corresponding to each audio frame in the audio data. For example, a mean square error criterion such as minimum mean square error may be used to converge the linear combination relationship, so that the weighting coefficient can be solved.

In step 103, the audio feature and the encoded feature are fused to obtain a fused audio feature of the virtual object.

Feature fusion may refer to combining features of different attributes to obtain new features when given features of different attributes. Feature fusion can help capture a relationship between features of different attributes, and learn and utilize information in data from a plurality of angles, thereby enhancing the expressive ability of features. In this aspect of this disclosure, features of different attributes may refer to the audio feature and the encoded feature. The process of combining the audio feature and the encoded feature to obtain the fused feature may be referred to as feature fusion. The fused audio feature may be an audio feature obtained by fusing the audio feature and the encoded feature.

There are many manners of fusing the audio feature and the encoded feature. For example, the audio feature and encoded feature may be spliced to obtain the fused audio feature of the virtual object.

In an aspect, the audio feature and the encoded feature may be weighted by using a preset feature weight, and the weighted audio feature and the weighted encoded feature are spliced to obtain the fused audio feature of the virtual object.

The preset feature weight may be a weight value preset for the audio feature (for example, a frequency feature, specifically an MFCC feature) and the encoded feature (for example, a linear encoded feature), and is used to implement fusion of the audio feature corresponding to the audio data and the encoded feature. For example, assuming that a preset feature weight corresponding to an audio feature M is m, and a preset feature weight corresponding to an encoded feature N is n, the preset feature weight may be used to weight the audio feature and the encoded feature to obtain a weighted audio feature $m*M$ and a weighted encoded feature $n*N$. Therefore, the weighted audio feature and the weighted encoded feature may be spliced to obtain a fused audio feature $m*M+n*N$ of the virtual object.

When the audio feature is a frequency feature and the encoded feature is a linear predictive encoded feature, the feature fusion manner is similar to the above. Details are not described herein again.

In this aspect of this disclosure, the preset feature weight may be set based on the importance of the feature. The higher the importance of the feature, the higher the preset feature weight. The lower the importance of the feature, the lower the preset feature weight. Normally, a preset feature weight of each feature is a value greater than 0 and less than 1. In a possible implementation, a sum of the preset feature weight of the audio feature and the preset feature weight of the encoded feature may be 1.

In step 104, updated status data of the virtual object is obtained according to the fused audio feature and the initial status data. For example, updated image data of the virtual object is generated according to the fused audio feature and the initial image data.

To match the status data of the virtual object with the audio data, in this aspect of this disclosure, the initial status data may be updated based on the audio data, so that the status of the target part in the updated status data is synchronized with the audio data. Therefore, in this aspect of this disclosure, the updated status data of the virtual object can be obtained according to the fused audio feature and the initial status data. Appearance data may be data of the appearance of the virtual object, and the target part may be a part of the appearance of the virtual object that needs to be updated according to the audio data, which, for example, may be the mouth. Therefore, the mouth shape of the virtual object can be adapted and changed according to the content of the audio data, to achieve a natural and realistic display of a speech process of the virtual object. In some possible implementations, the target part may further include eyes, checks, forehead, and other parts. When the virtual object speaks based on the audio data, changes in the mouth (mouth shape), eyes, checks, forehead, and other parts match the content in the audio data, to achieve a real virtual object speech scene. The updated status data may be status data obtained based on the initial status data of the virtual object obtained based on the fused audio feature as the content in the audio data changes, or may be status data characterizing changes in the status of the target part in the appearance of the virtual object based on the audio data.

Figure 4A:
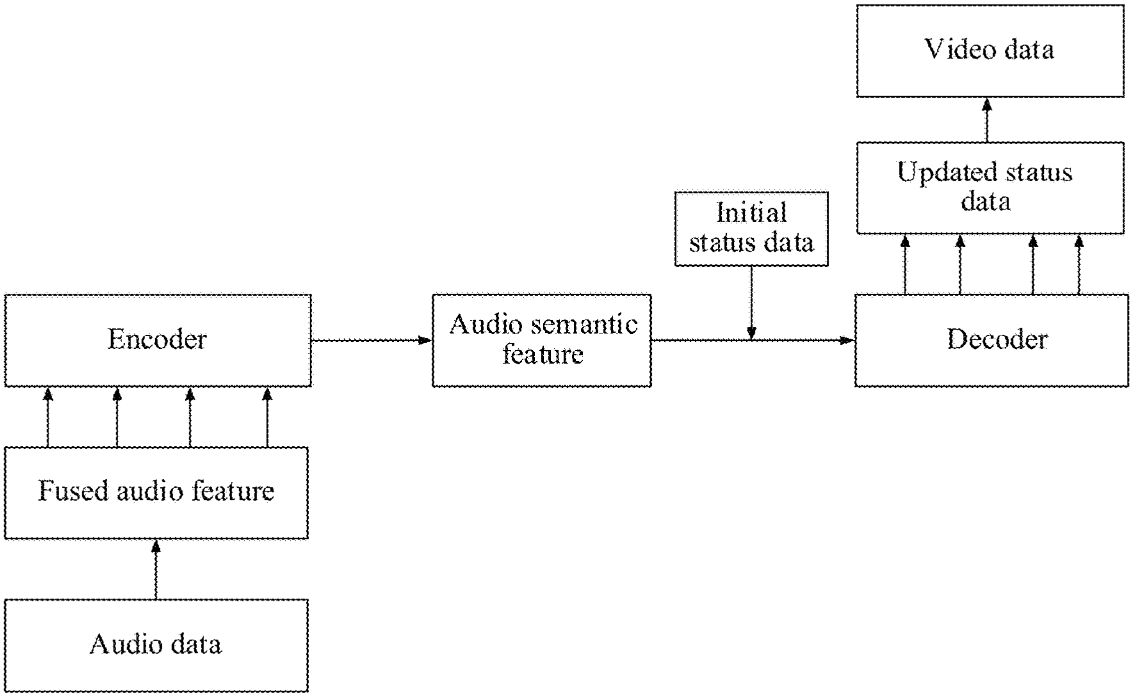
FIG. 4*a* is an overall schematic flowchart of a video generation method according to an aspect of this disclosure.

There are many manners of obtaining the updated status data according to the fused audio feature and the initial status data. In a possible implementation, a trained neural network model may be used to obtain the updated status data according to the fused audio feature and the initial status data. The neural network model may be a convolutional neural network (CNN), a recurrent neural network (RNN), a long short-term memory network (LSTM), a general uncertainty reasoning model (GUR), a bi-directional long short-term memory model (BILSTM), and the like. For example, FIG. 4*a* is an overall schematic flowchart of a video generation method according to an aspect of this disclosure. By using an RNN model as an example, the RNN model may be used to update appearance data of a virtual object according to a fused audio feature and initial status data. The RNN model may include an encoder structure (Encoder) and a decoder structure (Decoder). When updated status data is obtained according to the fused audio feature and the initial status data through the RNN model, a specific process of video generation may be to input the fused audio feature obtained based on audio data into the encoder structure, and use the encoder structure to extract an audio semantic feature from the fused audio feature. The audio semantic feature and an initial appearance feature are inputted to the decoder structure, and the decoder structure outputs the updated status data, and then generates video data based on the updated status data and the audio data.

In another possible implementation, the manner of obtaining the updated status data of the virtual object according to the fused audio feature and the initial status data may be to perform semantic feature extraction on the fused audio feature to obtain the audio semantic feature corresponding to the audio data, and generate the updated status data of the virtual object according to the initial status data and the audio semantic feature.

The audio semantic feature may be a feature that characterize semantic information of the audio data. For example, still refer to FIG. 4*a*. The encoder structure may be used to perform semantic feature extraction on the fused audio feature to obtain the audio semantic feature corresponding to the audio data. The decoder structure may be used to generate the updated status data characterizing the status change of the target part according to the initial status data and the audio semantic feature.

By extracting the audio semantic feature, the semantics of the audio data can be better understood. Different semantics may lead to different statuses of the target part matching the audio data, thereby improving the accuracy of the updated status data.

Figure 4B:
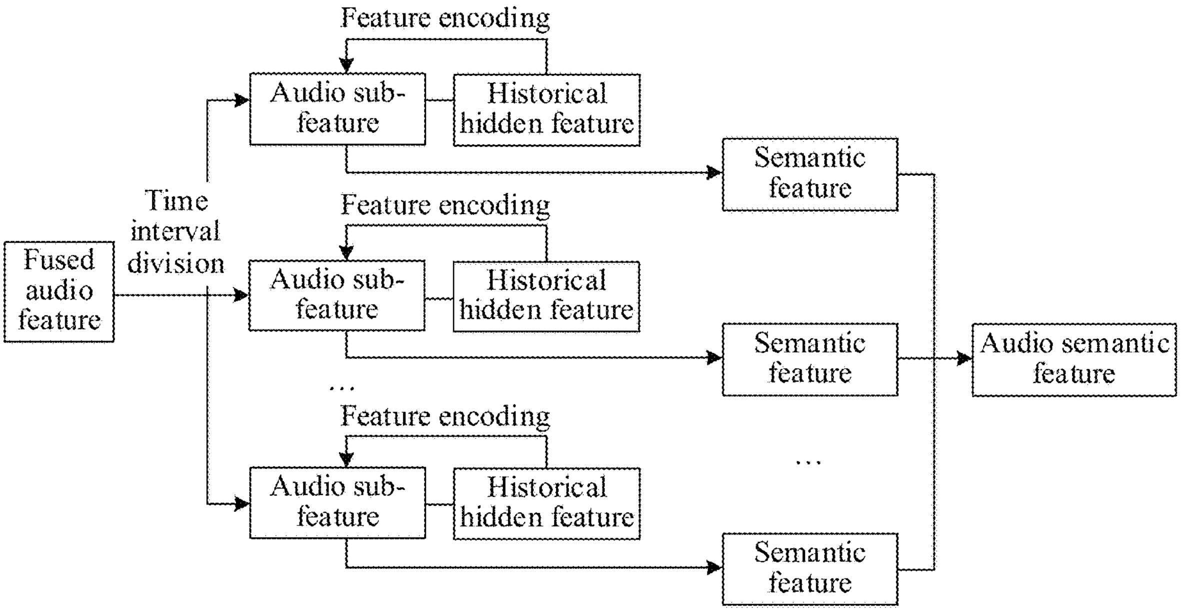
FIG. 4*b* is an overall schematic flowchart of determining an audio semantic feature according to an aspect of this disclosure.

There are many manners of performing semantic feature extraction on the fused audio feature. For example, the fused audio feature may be divided according to time intervals to obtain an audio sub-feature at each time interval. A historical hidden feature (or historical feature) corresponding to the audio sub-feature at the time interval is respectively obtained according to an order of time intervals. Feature encoding is performed on the audio sub-feature according to the historical hidden feature to obtain a semantic feature corresponding to the audio sub-feature, and the audio semantic feature corresponding to the fused audio feature is determined based on the semantic feature. Refer to FIG. 4*b*.

The time interval (timestep_size) may be a unit representing the processing of the fused audio feature, and the audio sub-feature may be a sub-feature obtained by dividing the fused audio feature by using the time interval as a dividing standard. The historical hidden feature may be a hidden feature generated based on a historical audio sub-feature, and the historical audio sub-feature may be an audio sub-feature corresponding to a previous time interval of the time interval. The hidden feature may characterize a correlation between the currently inputted audio sub-feature and status data outputted at the previous time interval, and for example, may be a hidden layer in a neural network model. The hidden feature may be information in the hidden layer corresponding to each time interval. The semantic feature may be a feature characterizing semantic information of each audio sub-feature. In a possible implementation, the semantic features corresponding to each audio sub-feature corresponding to the fused audio feature are spliced, to obtain the audio semantic feature corresponding to the audio data.

Figure 4C:
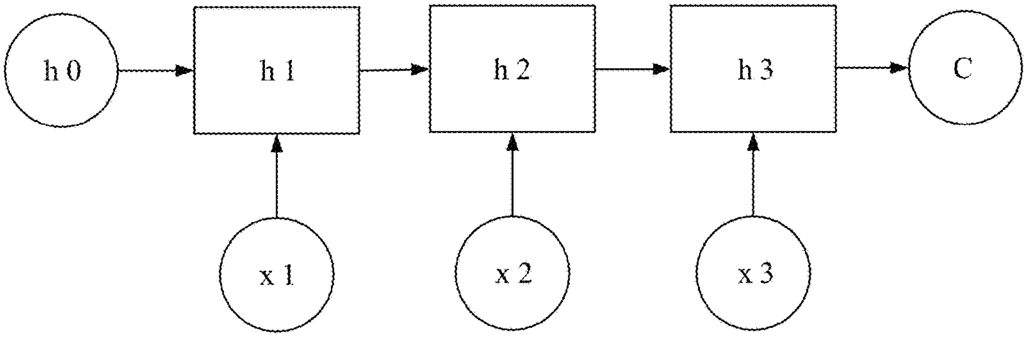
FIG. 4*c* is a schematic structural diagram of an encoder for a video generation method according to an aspect of this disclosure.

There may be many manners of performing feature encoding on the audio sub-feature according to the historical hidden feature to obtain the semantic feature corresponding to the audio sub-feature. For example, still refer to FIG. 4*a*, by using the RNN model as an example, the encoder structure in the RNN model may be used to perform semantic feature extraction on the fused audio feature. Specifically, FIG. 4*c* is a schematic structural diagram of an encoder for a video generation method according to an aspect of this disclosure, in which h0, h1, h2, and h3 can represent hidden features in the hidden layer in the encoder structure, x1, x2, and x3 represent audio sub-features inputted at each time interval, and C represents an audio semantic feature obtained through feature encoding. A hidden feature corresponding to each time interval may be determined according to a hidden feature at a previous time interval and an audio sub-feature inputted at this time interval. Assuming that the input of this time interval is the audio sub-feature x2, the historical hidden feature corresponding to audio sub-feature x2 is h1. In this case, the encoder may be used to perform feature encoding on the audio sub-feature x2 according to the historical hidden feature h1, to obtain the semantic feature h2 corresponding to the audio sub-feature, that is, the hidden feature corresponding to the time interval.

After feature encoding is performed on the audio sub-feature, the audio semantic feature corresponding to the fused audio feature can be determined based on the semantic feature. There may be many manners of determining the audio semantic feature corresponding to the fused audio feature based on the semantic feature. For example, a hidden feature (also a semantic feature) corresponding to the audio sub-feature at the last time interval of the fused audio feature may be used as the audio semantic feature corresponding to fused audio feature. For example, still refer to FIG. 4*c*, the semantic feature h3 corresponding to x3 may be used as the audio semantic feature C.

The audio semantic feature is determined based on the hidden feature, so that the correlation between the currently inputted audio sub-feature and the status data outputted at the previous time interval may be considered, thereby improving the accuracy of the audio semantic feature so that more accurate updated status data can be obtained subsequently.

After semantic feature extraction is performed on the fused audio feature, the updated status data can be generated according to the initial status data and the audio semantic feature. There may be many manners of generating the updated status data according to the initial status data and the audio semantic feature. For example, historical status data (or historical image data) generated at the previous time interval may be obtained; current status data (or current image data) corresponding to a current time interval is generated according to the historical status data and the audio semantic feature; and the updated status data is determined based on the current status data.

The historical status data may be status data generated based on the initial status data at the previous time interval, that is, may be status data at the previous time interval corresponding to the current time interval. The current status data may be status data generated based on the historical status data and the audio semantic feature, that is, status data at the current time interval.

There may be many manners of generating the current status data corresponding to the current time interval according to the historical status data and the audio semantic feature. For example, a target part parameter may be identified in the historical status data. Based on the audio semantic feature, the target part parameter is adjusted. The current status data corresponding to the current time interval is generated according to the adjusted target part parameter.

The target part parameter may be a parameter in the historical status data that characterizes a target part of the virtual object, which, for example, may be a parameter in the historical status data that characterizes the mouth of the virtual object.

The main purpose of this disclosure is to match the target part with the audio data, and the status of the target part may be characterized by the target part parameter. Therefore, in the foregoing manner, the target part parameter can be directly adjusted based on the audio semantic feature, to obtain the current status data. Therefore, the current status data can be obtained simply, directly and accurately only by adjusting the target part parameter.

In step 105, video data is generated according to the updated status data and the audio data. For example, video data including the updated image data and the audio data.

The status of the target part in the updated status data changes according to the audio data. However, the updated status data is the reflection of the virtual object on the screen. To obtain the video data of the virtual object, it is necessary to superimpose the updated status data and the audio data. In the superposition process, it is necessary to ensure that the status of the target part matches the audio data, to achieve synchronization between the status of the target part and the audio data. The video data may be a video generated based on the updated status data and the audio data, and may be a video in which a target part status of the virtual object matches the audio data, and for example, may be a video in which a change in the mouth shape of the virtual object matches the audio data.

There may be a plurality of manners of generating the video data according to the updated status data and the audio data. In a possible implementation, to avoid problems such as inconsistency between start time of the audio data and start time of the updated status data, or inconsistency between end time of the audio data and end time of the updated status data, when the video data is generated, the virtual object may be rendered based on the updated status data to obtain image data of the virtual object, and the updated status data and the audio data may be time-aligned, so that the image data and the audio data are synchronized. Based on the time-aligned image data and the audio data, the video data is generated.

Time alignment herein may mean making the start time of the audio data consistent with the start time of the updated status data, and the end time of the audio data consistent with the end time of the updated status data, so that the status of the target part in the video data and the audio data have a better matching effect.

When the initial status data is initial three-dimensional facial data, the image data may be data obtained by rendering a three-dimensional model of the virtual object according to the updated status data. For example, the data may include only the face of the virtual object, or may include images of the entire body structure of the virtual object, which can be designed according to specific circumstances. The audio data may be a time sequence, and the updated status data predicted based on the audio data in this time sequence is also a time sequence. Therefore, the audio data and the updated status data may be time-aligned.

There may be many manners of rendering the virtual object based on the updated status data. For example, rendering software such as a rendering engine (UE) and a three-dimensional graphics software (Blender) may be used to render the three-dimensional model of the virtual object.

Figure 5:
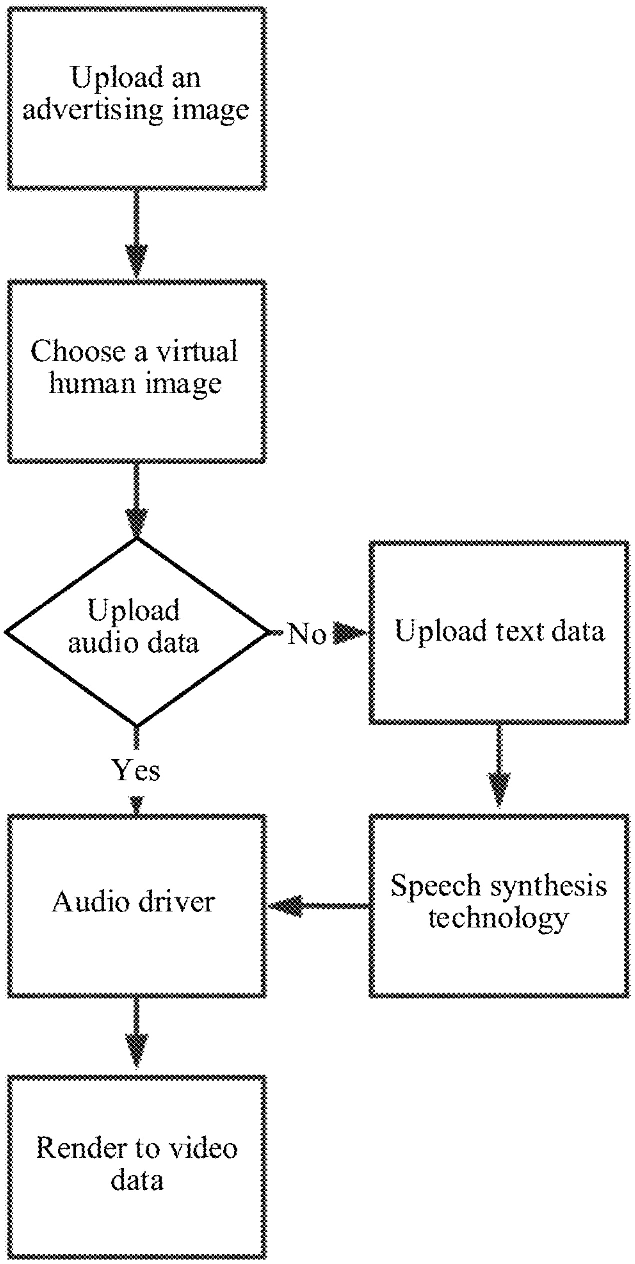
FIG. 5 is another specific schematic flowchart of a video generation method according to an aspect of this disclosure.

In an aspect, the video generation method provided in this aspect of this disclosure may be applied in an advertising scenario. For example, the virtual object is a virtual human. FIG. 5 is another specific schematic flowchart of a video generation method according to an aspect of this disclosure. The video generation method provided in this aspect of this disclosure may be integrated in an audio driver module. Therefore, pictures of advertisements may be uploaded, a virtual human image may be selected, and then audio data or text data may be uploaded. When text data is uploaded, the text data may be converted into audio data through a speech synthesis technology. When audio data is uploaded, the updated status data can be obtained directly through the audio driver module, and rendered into video data according to the updated status data. In this way, batch audio-driven 3D virtual human mouth shape parameter generation is achieved at low cost, and the matching between the generated virtual human mouth shape and the audio data is ensured.

As can be learned from above, according to the aspects of this disclosure, the initial status data corresponding to the virtual object and the audio data are obtained. The initial status data is data of the initial appearance of the virtual object. To match the appearance data of the virtual object with the audio data, the updated status data can be obtained based on the initial status data, so that a target part change of the virtual object represented by the appearance data matches the audio data. Specifically, the audio feature can be extracted from the audio data, and the audio data can be encoded to obtain the encoded feature, so that the audio feature and the encoded feature can be fused to obtain the fused audio feature of the virtual object. Because the fused audio feature is obtained through fusion based on two different feature (that is, the audio feature and the encoded feature), the audio feature and the encoded feature can reflect features of the audio data from different dimensions, so that the fused audio feature can more comprehensively and accurately characterize the features of the audio data. Based on such a fused audio feature and initial status data, the status of the target part can be obtained more accurately based on the updated status data obtained after the audio data changes, thereby generating, based on the updated status data and the audio data, video data in which the target part status and the audio data match. In this way, the audio feature and the encoded feature are extracted from the audio data, and the audio feature and the encoded feature are fused to obtain the fused audio feature, thereby generating the updated status data according to the fused audio feature and the initial status data, and further generating, based on the updated status data and the audio data, video data in which the target part status and the audio data match. This improves the accuracy of matching the target part and the audio data in the video data, and improves the accuracy of video generation for the virtual object, and further improves the efficiency of video generation for the virtual object.

The following gives a detailed description by using an example according to the method described in the foregoing aspects.

In this aspect, the descriptions are provided by using an example in which the video generation apparatus is specifically integrated in a computer device. A detailed description is made by using an example in which a server performs the video generation method, the virtual object is a virtual human, and the target part is a mouth.

Figure 6:
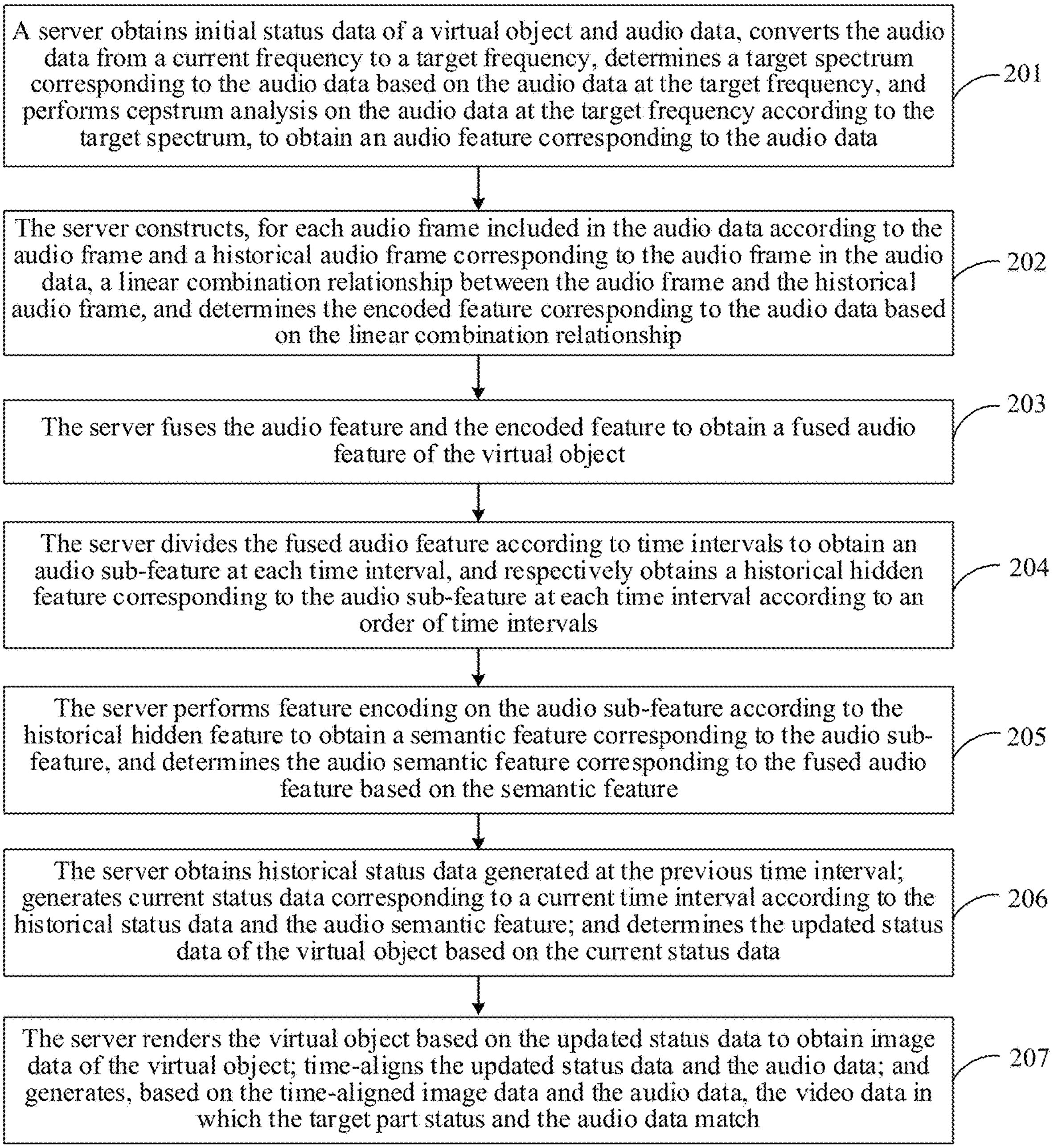
FIG. 6 is another schematic flowchart of a video generation method according to an aspect of this disclosure.

To better describe this aspect of this disclosure, FIG. 6 is another schematic flowchart of a video generation method according to an aspect of this disclosure. A specific process is as follows:

In step 201, s server obtains initial status data of a virtual object and audio data, converts the audio data from a current frequency to a target frequency, determines a target spectrum corresponding to the audio data based on the audio data at the target frequency, and performs cepstrum analysis on the audio data at the target frequency according to the target spectrum, to obtain an audio feature corresponding to the audio data.

In this aspect of this disclosure, text data may alternatively be obtained, and then the audio data is obtained according to the text data, where the text data may be data in the form of text, for example, may be text data such as advertising copy or news copy. There are many manners of obtaining the audio data according to the text data. For example, a semantic synthesis technology may be used to convert text data into audio data. For example, a Tacotron model may be used.

After obtaining the initial status data corresponding to the virtual object and the audio data, the server may convert the audio data from a current frequency to a target frequency, and determine a target spectrum corresponding to the audio data based on the audio data at the target frequency. There are many manners of converting, by the server, the audio data from the current frequency to the target frequency, and determining the target spectrum corresponding to the audio data based on the audio data at the target frequency. For example, framing processing may be performed by the server on the audio data to obtain a plurality of audio frames. For each audio frame in the plurality of audio frames, windowing processing is performed on the audio frame, and frequency domain conversion processing is performed on the windowed audio frame to obtain spectrum information of the audio frame. Target frequency filtering is performed on the spectrum information to obtain the target spectrum corresponding to the audio data.

There are many manners of performing framing processing on the audio data by the server. For example, the audio data may be pre-emphasized by the server to enhance the high-frequency part to flatten the spectrum of the audio signal. Meanwhile, effects caused by vocal cords and lips in the audio data may be eliminated, and the high-frequency part of the speech signal that is suppressed by the articulation system can be compensated, so that framing processing can be performed on the pre-emphasized audio data to divide the audio data into a plurality of audio frames to facilitate analysis of the audio data.

After performing framing processing on the audio data, the server may perform windowing processing on the audio frame. There may be many manners of performing windowing processing on the audio frame by the server. For example, a window function may be used by the server to perform windowing processing on the audio frame. For example, a Hamming window may be used to perform windowing processing on the audio frame.

After windowing processing is performed on the audio frame, frequency domain conversion processing may be performed by the server on the windowed audio frame. There are many manners of performing frequency domain conversion on the windowed audio frame by the server. For example, Fourier transform methods such as Fast Fourier Transform (FFT) may be used by the server to convert the signal of the windowed audio frame in time domain into the energy distribution in frequency domain, thereby obtaining the spectrum information corresponding to each audio frame.

After frequency domain conversion processing is performed on the windowed audio frame, target frequency filtering may be performed on the spectrum information by the server. There may be many manners of performing target frequency filtering on the spectrum information by the server. For example, a filter bank corresponding to the target frequency may be used by the server to perform target frequency filtering on the spectrum information of the audio frame, to remove the redundant information in the spectrum information and obtain the target spectrum corresponding to the audio data. The filter bank may be a plurality of filter banks based on dividing the spectrum of the target frequency according to the sensitivity of the human car, and for example, may be a Mel filter bank.

There are many manners of performing, by the server, cepstrum analysis on the audio data at the target frequency according to the target spectrum. For example, nonlinear conversion may be performed by the server on the target spectrum to obtain a nonlinear conversion result, and low-frequency information extraction may be performed on the nonlinear conversion result to obtain low-frequency information of the audio data, and extract the audio feature corresponding to the audio data from the low-frequency information.

There are many manners of performing nonlinear conversion on the target spectrum by the server. For example, the server may perform a logarithmic operation on the target spectrum to obtain the nonlinear conversion result. Because perception of the human car for sound is not linear, converting the target spectrum to a nonlinear relationship such as logarithmic operation can better achieve the description of the audio signal of the audio data.

After nonlinear conversion is performed on the target spectrum, low-frequency information extraction may be performed by the server on the nonlinear conversion result. There are many manners of performing low-frequency information extraction on the nonlinear conversion result by the server. For example, discrete cosine transform, discrete Fourier transform and other transformation methods may be used to perform low-frequency information extraction on the nonlinear conversion result, to concentrate the energy corresponding to the audio data into the low-frequency part.

After low-frequency information extraction is performed by the server on the nonlinear conversion result, the audio feature corresponding to the audio data may be extracted from the low-frequency information. There are many manners of extracting the audio feature corresponding to the audio data from the low-frequency information by the server. For example, some coefficients may be selected from the low-frequency information as the audio feature. For example, assuming that the target frequency is a Mel frequency, the second coefficient to the thirteenth coefficient may be used as Mel frequency cepstral coefficients in the low-frequency information obtained after discrete cosine transform, so that the Mel frequency cepstral coefficient corresponding to each audio frame may be used as the feature information corresponding to the audio frame. According to the feature information of each audio frame, the audio feature corresponding to the audio data can be obtained. In a possible implementation, because the audio signal is continuous in time domain, the feature information of the audio frame extracted through framing only reflects characteristics of the audio of this frame. To make the feature better reflect the time domain continuity, the feature information corresponding to the audio frame corresponding to the audio data can be added by the server to the feature dimension by the dimension of the preceding and following frame information, thereby obtaining the audio feature corresponding to the audio data.

In step 202, the server constructs, for each audio frame included in the audio data according to the audio frame and a historical audio frame corresponding to the audio frame in the audio data, a linear combination relationship between the audio frame and the historical audio frame, and determines the encoded feature corresponding to the audio data based on the linear combination relationship.

There may be many manners of constructing, by the server, the linear combination relationship between the audio frame and the historical audio frame according to the audio frame and the historical audio frame corresponding to the audio frame in the audio data. For example, assuming that the audio data is (Y1, Y2, Y3, Y4), for the audio frame Y3, a linear combination relationship between the audio frame and the historical audio frame may be constructed as $Y3=a1*Y1+a2*Y2$, where a1 and a2 may be weighting coefficients in the linear combination.

After the linear combination relationship between the audio frame and the historical audio frame is constructed by the server according to the audio frame of the audio data and the historical audio frame corresponding to the audio frame in the audio data, the encoded feature corresponding to the audio data can be determined based on the linear combination relationship. There may be many manners of determining, by the server, the encoded feature corresponding to the audio data based on the linear combination relationship. For example, the linear combination relationship may be converged by the server to minimize an error between a predicted audio signal and an initial audio signal, so that a weighting coefficient can be solved, and the encoded feature corresponding to the audio data can be obtained according to the weighting coefficient corresponding to each audio frame in the audio data. For example, a mean square error criterion such as minimum mean square error may be used to converge the linear combination relationship, so that the weighting coefficient can be solved.

In step 203, the server fuses the audio feature and the encoded feature to obtain a fused audio feature of the virtual object.

There are many manners of fusing the audio feature and the encoded feature by the server. For example, the audio feature and encoded feature may be spliced by the server to obtain the fused audio feature of the virtual object.

In an aspect, the audio feature and the encoded feature may be weighted by the server by using a preset feature weight, and the weighted audio feature and the weighted encoded feature are spliced to obtain the fused audio feature of the virtual object.

For example, assuming that a preset feature weight corresponding to an audio feature M is m, and a preset feature weight corresponding to an encoded feature N is n, the preset feature weight may be used to weight the audio feature and the encoded feature to obtain a weighted audio feature $m*M$ and a weighted encoded feature $n*N$. Therefore, the weighted audio feature and the weighted encoded feature may be spliced to obtain a fused audio feature $m*M+n*N$ of the virtual object.

In step 204, the server divides the fused audio feature according to time intervals to obtain an audio sub-feature at each time interval, and respectively obtains a historical hidden feature corresponding to the audio sub-feature at each time interval according to an order of time intervals.

The time interval may be a unit representing the processing of the fused audio feature, and the audio sub-feature may be a sub-feature obtained by dividing the fused audio feature by using the time interval as a dividing standard. The historical hidden feature may be a hidden feature generated based on a historical audio sub-feature, and the historical audio sub-feature may be an audio sub-feature corresponding to a previous time interval of the time interval. The hidden feature may characterize a correlation between the currently inputted audio sub-feature and facial data outputted at the previous time interval, and for example, may be a hidden layer in a neural network model. The hidden feature may be information in the hidden layer corresponding to each time interval.

In step 205, the server performs feature encoding on the audio sub-feature according to the historical hidden feature to obtain a semantic feature corresponding to the audio sub-feature, and determines the audio semantic feature corresponding to the fused audio feature based on the semantic feature.

There may be many manners of performing, by the server, feature encoding on the audio sub-feature according to the historical hidden feature. For example, still refer to FIG. 4*a*, by using the RNN model as an example, the encoder structure in the RNN model may be used by the server to perform semantic feature extraction on the fused audio feature. Specifically, refer to FIG. 4*c*, h0, h1, h2, and h3 can represent hidden features in the hidden layer in the encoder structure, x1, x2, and x3 represent audio sub-features inputted at each time interval, and C represents an audio semantic feature obtained through feature encoding. A hidden feature corresponding to each time interval may be determined according to a hidden feature at a previous time interval and an audio sub-feature inputted at this time interval. Assuming that the input of this time interval is the audio sub-feature x2, the historical hidden feature corresponding to audio sub-feature x2 is h1. In this case, the encoder may be used by the server to perform feature encoding on the audio sub-feature x2 according to the historical hidden feature h1, to obtain the semantic feature h2 corresponding to the audio sub-feature, that is, the hidden feature corresponding to the time interval.

After feature encoding is performed by the server on the audio sub-feature, the audio semantic feature corresponding to the fused audio feature can be determined based on the semantic feature. There may be many manners of determining the audio semantic feature corresponding to the fused audio feature based on the semantic feature. For example, a hidden feature (also a semantic feature) corresponding to the audio sub-feature at the last time interval of the fused audio feature may be used by the server as the audio semantic feature corresponding to fused audio feature. For example, still refer to FIG. 4*c*, the semantic feature h3 corresponding to x3 may be used as the audio semantic feature C.

In step 206, the server obtains historical status data generated at the previous time interval; generates current status data corresponding to a current time interval according to the historical status data and the audio semantic feature; and determines the updated status data of the virtual object based on the current status data.

There may be many manners of generating, by the server, the current status data corresponding to the current time interval according to the historical status data and the audio semantic feature. For example, a target part parameter may be identified by the server in the historical status data. Based on the audio semantic feature, the target part parameter is adjusted. The current status data corresponding to the current time interval is generated according to the adjusted target part parameter.

The target part parameter may be a parameter in the historical status data that characterizes a mouth change of the virtual human.

In step 207, the server renders the virtual object based on the updated status data to obtain image data of the virtual object; time-aligns the updated status data and the audio data; and generates, based on the time-aligned image data and the audio data, the video data in which the target part status and the audio data match.

There may be many manners of rendering the virtual object based on the updated status data by the server. For example, rendering software such as a rendering engine (UE) and a three-dimensional graphics software (Blender) may be used by the server to render the three-dimensional model of the virtual human.

In an aspect, the video generation method provided in this aspect of this disclosure may be applied in an advertising scenario. For example, the virtual object is a virtual human. Still refer to FIG. 5, the video generation method provided in this aspect of this disclosure may be integrated in an audio driver module. Therefore, pictures of advertisements may be uploaded, a virtual human image may be selected, and then audio data or text data may be uploaded. When text data is uploaded, the text data may be converted into audio data through a speech synthesis technology. When audio data is uploaded, the updated status data can be obtained directly through the audio driver module, and rendered into video data according to the updated status data. In this way, batch audio-driven 3D virtual human mouth shape parameter generation is achieved at low cost, and the matching between the generated virtual human mouth shape and the audio data is ensured.

As can be learned from above, according to the aspects of this disclosure, the initial status data corresponding to the virtual object and the audio data are obtained. The initial status data is data of the initial appearance of the virtual object. To match the appearance data of the virtual object with the audio data, the updated status data can be obtained based on the initial status data, so that a target part change of the virtual object represented by the appearance data matches the audio data. Specifically, the audio feature can be extracted from the audio data, and the audio data can be encoded to obtain the encoded feature, so that the audio feature and the encoded feature can be fused to obtain the fused audio feature of the virtual object. Because the fused audio feature is obtained through fusion based on two different feature (that is, the audio feature and the encoded feature), the audio feature and the encoded feature can reflect features of the audio data from different dimensions, so that the fused audio feature can more comprehensively and accurately characterize the features of the audio data. Based on such a fused audio feature and initial status data, the status of the target part can be obtained more accurately based on the updated status data obtained after the audio data changes, thereby generating, based on the updated status data and the audio data, video data in which the target part status and the audio data match. In this way, the audio feature and the encoded feature are extracted from the audio data, and the audio feature and the encoded feature are fused to obtain the fused audio feature, thereby generating the updated status data according to the fused audio feature and the initial status data, and further generating, based on the updated status data and the audio data, video data in which the target part status and the audio data match. This improves the accuracy of matching the target part and the audio data in the video data, and improves the accuracy of video generation for the virtual object, and further improves the efficiency of video generation for the virtual object.

To better implement the foregoing method, an aspect of the present disclosure further provides a video generation apparatus, and the video generation apparatus may be integrated in a computer device. The computer device may be a server.

Figure 7:
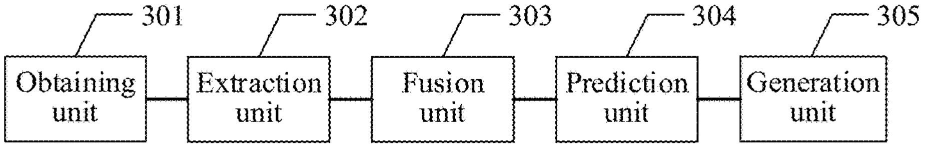
FIG. 7 is a schematic structural diagram of a video generation apparatus according to an aspect of this disclosure.

For example, FIG. 7 is a schematic structural diagram of a video generation apparatus according to an aspect of this disclosure. The video generation apparatus may include an obtaining unit 301, an extraction unit 302, a fusion unit 303, a prediction unit 304, and a generation unit 305, as follows:

The obtaining unit 301 is configured to obtain initial status data of a virtual object and audio data.

The extraction unit 302 is configured to extract an audio feature from the audio data, and encode the audio data to obtain an encoded feature.

The fusion unit 303 is configured to fuse the audio feature and the encoded feature to obtain a fused audio feature of the virtual object.

The prediction unit 304 is configured to obtain updated status data of the virtual object according to the fused audio feature and the initial status data.

The generation unit 305 is configured to generate video data according to the updated status data and the audio data.

In an aspect, the prediction unit 304 includes:

a semantic feature extraction sub-unit, configured to perform semantic feature extraction on the fused audio feature to obtain an audio semantic feature corresponding to the audio data; and an updated status data generation sub-unit, configured to generate the updated status data of the virtual object according to the initial status data and the audio semantic feature.

In an aspect, the semantic feature extraction sub-unit includes:

a time division module, configured to divide the fused audio feature according to time intervals to obtain an audio sub-feature at each time interval;

a historical hidden feature obtaining module, configured to respectively obtain a historical hidden feature corresponding to the audio sub-feature at each time interval according to an order of time intervals, where the historical hidden feature is a hidden feature generated based on a historical audio sub-feature, and the historical audio sub-feature is an audio sub-feature corresponding to a previous time interval of the time interval; and a feature encoding module, configured to perform feature encoding on the audio sub-feature according to the historical hidden feature to obtain a semantic feature corresponding to the audio sub-feature, and determine the audio semantic feature corresponding to the fused audio feature based on the semantic feature.

In an aspect, the updated status data generation sub-unit includes:

a historical status data obtaining module, configured to obtain historical status data generated at the previous time interval, where the historical status data is status data generated based on the initial status data at the previous time interval;

a current status data generation module, configured to generate current status data corresponding to a current time interval according to the historical status data and the audio semantic feature; and an updated status data determining module, configured to determine the updated status data based on the current status data.

In an aspect, the current status data generation module includes:

an identification sub-module, configured to identify a target part parameter in the historical status data, where the target part parameter is a parameter characterizing a target part of the virtual object in the historical status data;

a parameter adjustment sub-module, configured to adjust the target part parameter based on the audio semantic feature; and a current facial data generation sub-module, configured to generate the current status data corresponding to the current time interval according to the adjusted target part parameter.

In an aspect, the generation unit 305 includes:

a rendering sub-unit, configured to render the virtual object based on the updated status data to obtain image data of the virtual object;

a synchronization sub-unit, configured to time-align the updated status data and the audio data; and a video generation sub-unit, configured to generate the video data based on the time-aligned image data and the audio data.

In an aspect, the extraction unit 302 includes:

a frequency conversion sub-unit, configured to convert the audio data from a current frequency to a target frequency, and determine a target spectrum corresponding to the audio data based on the audio data at the target frequency; and a cepstrum analysis sub-unit, configured to perform cepstrum analysis on the audio data at the target frequency according to the target spectrum to obtain the audio feature corresponding to the audio data.

In an aspect, the frequency conversion sub-unit includes:

a framing module, configured to perform framing processing on the audio data to obtain a plurality of audio frames;

a frequency domain conversion module, configured to perform, for each audio frame in the plurality of audio frames, windowing processing on the audio frame, and perform frequency domain conversion processing on the windowed audio frame to obtain spectrum information of the audio frame; and a filtering sub-unit, configured to perform target frequency filtering on the spectrum information to obtain the target spectrum corresponding to the audio data.

In an aspect, the cepstrum analysis sub-unit includes:

a nonlinear conversion module, configured to perform nonlinear conversion on the target spectrum to obtain a nonlinear conversion result;

an information extraction module, configured to perform low-frequency information extraction on the nonlinear conversion result to obtain low-frequency information of the audio data; and a feature determining module, configured to extract the audio feature corresponding to the audio data from the low-frequency information.

In an aspect, the encoding is linear predictive coding, and the extraction unit 302 includes:

a linear combination relationship construction sub-unit, configured to construct, for each audio frame included in the audio data according to the audio frame and a historical audio frame corresponding to the audio frame in the audio data, a linear combination relationship between the audio frame and the historical audio frame; and an encoded feature determining sub-unit, configured to determine the encoded feature corresponding to the audio data based on the linear combination relationship.

In an aspect, the fusion unit 303 includes:

a weighting sub-unit, configured to weight the audio feature and the encoded feature by using a preset feature weight; and a splicing sub-unit, configured to splice the weighted audio feature and the weighted encoded feature to obtain the fused audio feature of the virtual object.

During specific implementation, the foregoing units may be implemented as independent entities, or may be combined arbitrarily and implemented as the same entity or a plurality of entities. For specific implementation of the foregoing units, reference can be made to the foregoing method aspects, so the details are not described herein again.

As can be learned from above, in this aspect of this disclosure, the obtaining unit 301 obtains initial status data corresponding to a virtual object and audio data; the extraction unit 302 extracts an audio feature from the audio data, and encodes the audio data to obtain an encoded feature; thee fusion unit 303 fuses the audio feature and the encoded feature to obtain a fused audio feature of the virtual object; the prediction unit 304 obtains updated status data according to the fused audio feature and the initial status data; and the generation unit 305 generates video data according to the updated status data and the audio data. In this way, the audio feature and the encoded feature are extracted from the audio data, and the audio feature and the encoded feature are fused to obtain the fused audio feature, thereby generating the updated status data according to the fused audio feature and the initial status data, and further generating, based on the updated status data and the audio data, video data in which the target part status and the audio data match. This improves the accuracy of matching the target part and the audio data in the video data, and improves the accuracy of video generation for the virtual object, and further improves the efficiency of video generation for the virtual object.

Figure 8:
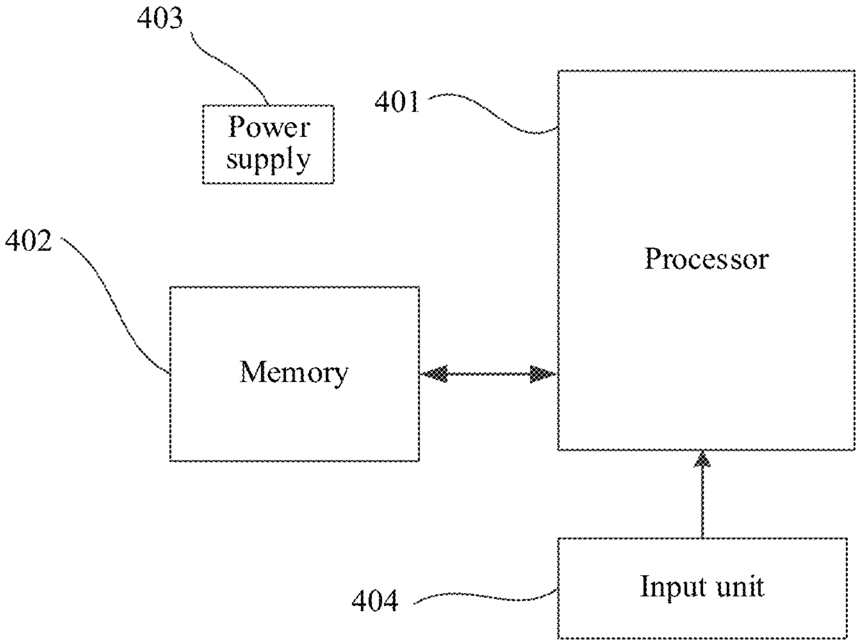
FIG. 8 is a schematic structural diagram of a computer device according to an aspect of this disclosure.

An aspect of this disclosure further provides a computer device. FIG. 8 is a schematic structural diagram of a computer device according to an aspect of this disclosure. The computer device may be a server. Specifically:

the computer device may include components such as a processor 401 (e.g., processing circuitry) including one or more processing cores, a memory 402 including one or more non-transitory computer-readable storage media, a power supply 403, and an input unit 404. A person skilled in the art may understand that, the structure of the computer device shown in FIG. 8 does not constitute a limitation to the computer device. The computer device may include components that are more or fewer than those shown in the figure, or some components may be combined, or a different component deployment may be used.

The processor 401 is a control center of the computer device, and connects to various parts of the entire computer device by using various interfaces and lines. By running or executing software programs and/or modules stored in the memory 402, and invoking data stored in the memory 402, the processor performs various functions and data processing of the computer device. In some aspects, the processor 401 may include one or more processing cores. In an aspect, the processor 401 may be integrated as an application processor and a modem processor. The application processor mainly processes an operating system, a user interface, an application program, and the like. The modem processor mainly processes wireless communication. It may be understood that the foregoing modem processor may alternatively not be integrated into the processor 401.

The memory 402 may be configured to store a software program and a module, and the processor 401 runs the software program and the module that are stored in the memory 402, to implement various functional applications and video generation for a virtual object. The memory 402 may mainly include a program storage area and a data storage area. The program storage area may store an operating system, an application program required by at least one function (such as a sound playing function and an image display function), and the like. The data storage area may store data created according to use of the server, and the like. In addition, the memory 402 may include a high speed random access memory, and may further include a non-volatile memory, such as at least one magnetic disk storage device, a flash memory, or another volatile solid-state storage device. Correspondingly, the memory 402 may further include a memory controller, to provide access of the processor 401 to the memory 402.

The computer device further includes the power supply 403 for supplying power to the components. In an aspect, the power supply 403 may be logically connected to the processor 401 by using a power management system, thereby implementing functions such as charging, discharging, and power consumption management by using the power management system. The power supply 403 may further include one or more direct current or alternating current power supplies, a re-charging system, a power failure detection circuit, a power supply converter or inverter, a power supply state indicator, and any other component.

The computer device may further include the input unit 404. The input unit 404 may be configured to receive entered numeric or character information and generate keyboard, mouse, joystick, optical, or trackball signal input related to user settings and function control.

Although not shown in the figure, the computer device may further include a display unit, and the like. Details are not described herein again. Specifically, in this aspect, the processor 401 in the computer device may load executable files corresponding to processes of one or more application programs to the memory 402 according to the following instructions, and the processor 401 runs the application programs stored in the memory 402 to implement the following various functions:

obtaining initial status data of a virtual object and audio data;

extracting an audio feature from the audio data, and encoding the audio data to obtain an encoded feature;

fusing the audio feature and the encoded feature to obtain a fused audio feature of the virtual object; and obtaining updated status data of the virtual object according to the fused audio feature and the initial status data.

For specific implementations of the above operations, refer to the foregoing aspects. Details are not described herein again. The computer device provided in this aspect of this disclosure is of the same concept as the video generation method in the foregoing aspects. The specific implementation process is detailed in the foregoing method aspects. Details are not described herein again.

A person of ordinary skill in the art may understand that, all or some steps of the methods in the foregoing aspects may be implemented by using instructions, or implemented through instructions controlling relevant hardware, and the instructions may be stored in a computer-readable storage medium and loaded and executed by a processor.

Therefore, an aspect of this disclosure provides a computer-readable storage medium in which a computer program is stored. The computer program can be loaded by a processor to perform steps in any virtual object video generation method provided in the aspects of this disclosure.

The computer-readable storage medium may include a read-only memory (ROM), a random access memory (RAM), a magnetic disk, an optical disc, or the like.

Because instructions stored in the computer-readable storage medium may perform steps of any video generation method in the aspects of this disclosure, the instructions can implement advantageous effects that may be implemented by any video generation method in the aspects of this disclosure. The foregoing aspects may be referred to for details. Details are not further described herein.

According to an aspect of this disclosure, a computer program product is provided. The computer program product includes a computer program. The computer program is stored in a computer-readable storage medium. A processor of a computer device reads the computer program from the computer-readable storage medium, and executes the computer program, to cause the computer device to perform the method provided in various implementations of the foregoing aspect.

The term module (and other similar terms such as unit, submodule, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

The foregoing disclosure includes some exemplary embodiments of this disclosure which are not intended to limit the scope of this disclosure. Other embodiments shall also fall within the scope of this disclosure.

What is claimed is:

1. A video generation method, comprising:

obtaining audio data and initial image data of a virtual object;

extracting an audio feature from the audio data, and performing predictive encoding on the audio data to obtain an encoded feature representing vocal channel characteristics of the audio data;

fusing the audio feature and the encoded feature to obtain a fused audio feature;

dividing the fused audio feature according to time intervals to obtain audio sub-features at the respective time intervals;

determining audio semantic features corresponding to the audio sub-features at the respective time intervals;

generating updated image data of the virtual object according to the initial image data and the audio semantic features; and generating video data including the updated image data and the audio data.

2. The video generation method according to claim 1, wherein the determining the audio semantic features comprises, for each of the time intervals:

respectively obtaining a historical feature corresponding to the audio sub-feature at the respective time interval according to an order of the time intervals, the historical feature being a feature generated based on a historical audio sub-feature corresponding to a previous time interval of the respective time interval;

performing feature encoding on the audio sub-feature at the respective time interval according to the historical feature to obtain a semantic feature corresponding to the audio sub-feature at the respective time interval; and determining the respective audio semantic feature corresponding to the fused audio feature based on the semantic feature corresponding to the audio sub-feature at the respective time interval.

3. The video generation method according to claim 2, wherein the generating the updated image data of the virtual object according to the initial image data and the audio semantic features comprises:

obtaining historical image data generated at the previous time interval, wherein the historical image data is image data generated based on the initial image data at the previous time interval;

generating current image data corresponding to a current time interval according to the historical image data and the respective audio semantic feature; and determining the updated image data based on the current image data.

4. The video generation method according to claim 3, wherein the generating the current image data comprises:

identifying a target part parameter in the historical image data, wherein the target part parameter is a parameter of a target part of the virtual object in the historical image data;

adjusting the target part parameter based on the respective audio semantic feature; and generating the current image data corresponding to the current time interval according to the adjusted target part parameter.

5. The video generation method according to claim 1, wherein the generating the video data comprises:

rendering the virtual object based on the updated image data to obtain image data of the virtual object;

time-aligning the updated image data and the audio data; and generating the video data based on the time-aligned image data and the audio data.

6. The video generation method according to claim 1, wherein the extracting the audio feature from the audio data comprises:

converting the audio data from a current frequency to a target frequency, and determining a target spectrum corresponding to the audio data based on the audio data at the target frequency; and performing cepstrum analysis on the audio data at the target frequency according to the target spectrum to obtain the audio feature corresponding to the audio data.

7. The video generation method according to claim 6, wherein the converting the audio data comprises:

performing framing processing on the audio data to obtain a plurality of audio frames;

performing, for each audio frame in the plurality of audio frames, windowing processing on the audio frame, and performing frequency domain conversion processing on the windowed audio frame to obtain spectrum information of the audio frame; and performing target frequency filtering on the spectrum information of each audio frame in the plurality of audio frames to obtain the target spectrum corresponding to the audio data.

8. The video generation method according to claim 6, wherein the performing the cepstrum analysis comprises:

performing nonlinear conversion on the target spectrum to obtain a nonlinear conversion result;

performing low-frequency information extraction on the nonlinear conversion result to obtain low-frequency information of the audio data; and extracting the audio feature corresponding to the audio data from the low-frequency information.

9. The video generation method according to claim 1, wherein the predictive encoding is linear predictive coding, and the performing the predictive encoding on the audio data to obtain the encoded feature comprises:

constructing, for each audio frame comprised in the audio data according to the audio frame and a previous audio frame of the audio frame in the audio data, a linear combination relationship between the audio frame and the previous audio frame; and determining the encoded feature corresponding to the audio data based on the linear combination relationship.

10. The video generation method according to claim 1, wherein the fusing the audio feature and the encoded feature comprises:

weighting the audio feature and the encoded feature by using a preset feature weight; and splicing the weighted audio feature and the weighted encoded feature to obtain the fused audio feature.

11. A video generation apparatus, comprising:

processing circuitry configured to:

obtain audio data and initial image data of a virtual object;

extract an audio feature from the audio data, and perform predictive encoding on the audio data to obtain an encoded feature representing vocal channel characteristics of the audio data;

fuse the audio feature and the encoded feature to obtain a fused audio feature;

divide the fused audio feature according to time intervals to obtain audio sub-features at the respective time intervals;

determine audio semantic features corresponding to the audio sub-features at the respective time intervals;

generate updated image data of the virtual object according to the initial image data and the audio semantic features; and generate video data including the updated image data and the audio data.

12. The video generation apparatus according to claim 11, wherein the processing circuitry is further configured to:

respectively obtain a historical feature corresponding to the audio sub-feature at the respective time interval according to an order of the time intervals, the historical feature being a feature generated based on a historical audio sub-feature corresponding to a previous time interval of the respective time interval;

perform feature encoding on the audio sub-feature at the respective time interval according to the historical feature to obtain a semantic feature corresponding to the audio sub-feature at the respective time interval; and determine the respective audio semantic feature corresponding to the fused audio feature based on the semantic feature corresponding to the audio sub-feature at the respective time interval.

13. The video generation apparatus according to claim 12, wherein the processing circuitry is further configured to:

obtain historical image data generated at the previous time interval, wherein the historical image data is image data generated based on the initial image data at the previous time interval;

generate current image data corresponding to a current time interval according to the historical image data and the respective audio semantic feature; and determine the updated image data based on the current image data.

14. The video generation apparatus according to claim 13, wherein the processing circuitry is further configured to:

identify a target part parameter in the historical image data, wherein the target part parameter is a parameter of a target part of the virtual object in the historical image data;

adjust the target part parameter based on the respective audio semantic feature; and generate the current image data corresponding to the current time interval according to the adjusted target part parameter.

15. The video generation apparatus according to claim 11, wherein the processing circuitry is further configured to:

render the virtual object based on the updated image data to obtain image data of the virtual object;

time-align the updated image data and the audio data; and generate the video data based on the time-aligned image data and the audio data.

16. The video generation apparatus according to claim 11, wherein the processing circuitry is further configured to:

convert the audio data from a current frequency to a target frequency, and determine a target spectrum corresponding to the audio data based on the audio data at the target frequency; and perform cepstrum analysis on the audio data at the target frequency according to the target spectrum to obtain the audio feature corresponding to the audio data.

17. The video generation apparatus according to claim 16, wherein the processing circuitry is further configured to:

perform framing processing on the audio data to obtain a plurality of audio frames;

perform, for each audio frame in the plurality of audio frames, windowing processing on the audio frame, and perform frequency domain conversion processing on the windowed audio frame to obtain spectrum information of the audio frame; and perform target frequency filtering on the spectrum information of each audio frame in the plurality of audio frames to obtain the target spectrum corresponding to the audio data.

18. The video generation apparatus according to claim 11, wherein the processing circuitry is configured to:

weight the audio feature and the encoded feature by using a preset feature weight; and splice the weighted audio feature and the weighted encoded feature to obtain the fused audio feature.

19. A non-transitory computer-readable storage medium storing computer-readable instructions thereon, which, when executed by processing circuitry, cause the processing circuitry to perform a video generation method comprising:

obtaining audio data and initial image data of a virtual object;

extracting an audio feature from the audio data, and performing predictive encoding on the audio data to obtain an encoded feature representing vocal channel characteristics of the audio data;

fusing the audio feature and the encoded feature to obtain a fused audio feature;

dividing the fused audio feature according to time intervals to obtain audio sub-features at the respective time intervals;

determining audio semantic features corresponding to the audio sub-features at the respective time intervals;

generating updated image data of the virtual object according to the initial image data and the audio semantic features; and generating video data including the updated image data and the audio data.

20. The non-transitory computer-readable storage medium according to claim 19, wherein the determining the audio semantic features comprises, for each of the time intervals:

respectively obtaining a historical feature corresponding to the audio sub-feature at the respective time interval according to an order of the time intervals, the historical feature being a feature generated based on a historical audio sub-feature corresponding to a previous time interval of the respective time interval;

performing feature encoding on the audio sub-feature at the respective time interval according to the historical feature to obtain a semantic feature corresponding to the audio sub-feature at the respective time interval; and determining the respective audio semantic feature corresponding to the fused audio feature based on the semantic feature corresponding to the audio sub-feature at the respective time interval.

* * * * *